United States Patent

Moriyama et al.

[11] Patent Number: 6,128,064
[45] Date of Patent: Oct. 3, 2000

[54] LIQUID CRYSTAL DEVICE AND LIQUID CRYSTAL DISPLAY APPARATUS

[75] Inventors: Takashi Moriyama, Atsugi; Takao Takiguchi, Tokyo; Yukio Hanyu, Isehara; Koichi Sato, Atsugi; Masahiro Terada, Hadano; Shinichi Nakamura, Isehara; Yasufumi Asao, Atsugi; Koji Noguchi, Sagamihara; Yasushi Shimizu, Atsugi, all of Japan

[73] Assignee: Canon Kabushiki Kaisha, Tokyo, Japan

[21] Appl. No.: 09/353,154

[22] Filed: Jul. 14, 1999

[51] Int. Cl.$^7$ .......... C09K 19/02; G02F 1/1333; G02F 1/141

[52] U.S. Cl. .......... 349/173; 349/85; 349/133; 252/299.01; 428/1.26

[58] Field of Search .......... 349/173, 133, 349/85; 428/1.26; 252/299.01

[56] References Cited

U.S. PATENT DOCUMENTS

| | | | |
|---|---|---|---|
| 4,367,924 | 1/1983 | Clark et al. | 350/334 |
| 5,082,587 | 1/1992 | Janulis | 252/299.01 |
| 5,327,272 | 7/1994 | Fujiwara et al. | 349/173 |
| 5,347,381 | 9/1994 | Shinomiya et al. | 349/134 |
| 5,583,682 | 12/1996 | Kitayama et al. | 349/172 |
| 5,629,788 | 5/1997 | Mori et al. | 349/172 |
| 5,750,214 | 5/1998 | Ito et al. | 428/1 |
| 5,825,447 | 10/1998 | Hanyu et al. | 349/128 |
| 5,841,497 | 11/1998 | Sato et al. | 349/128 |
| 5,858,273 | 1/1999 | Asaoka et al. | 252/299.4 |
| 5,885,482 | 3/1999 | Asaoka et al. | 252/299.01 |
| 5,932,136 | 8/1999 | Terada et al. | 252/299.01 |

FOREIGN PATENT DOCUMENTS

| | | |
|---|---|---|
| 56-107216 | 8/1981 | Japan. |
| 63-027451 | 2/1988 | Japan. |
| 2-142753 | 5/1990 | Japan. |
| 6-256231 | 9/1994 | Japan. |
| 6-329591 | 11/1994 | Japan. |
| 7-118178 | 5/1995 | Japan. |
| 7-316555 | 12/1995 | Japan. |
| 11-52383 | 2/1999 | Japan. |

OTHER PUBLICATIONS

M. Shadt and W. Helfrich, "Voltage–dependent activity of a twisted nematic liquid crystal," *Applied Physics Letters,* vol. 18, No. 4, Feb. 15, 1971: 127–128.

*Primary Examiner*—Shean C. Wu
*Attorney, Agent, or Firm*—Fitzpatrick, Cella, Harper & Scinto

[57] ABSTRACT

A liquid crystal device is constituted by a chiral smectic liquid crystal and a pair of substrates sandwiching the chiral smectic liquid crystal therebetween and each having thereon an electrode for applying a voltage to the liquid crystal. At least one of the substrates being provided with an alignment control film comprising a specific aromatic polyimide which has been subjected to a uniaxial aligning treatment. The chiral smectic liquid crystal assumes bistability in a chiral smectic temperature range when incorporated in a test cell which is not provided with an alignment control film and has been subjected to shearing treatment. In the liquid crystal device including the polyimide alignment control film, the chiral smectic liquid crystal at least has a voltage-transmittance characteristic such that an effective tilt angle and a transmittance continuously change depending on an electric field applied thereto.

14 Claims, 7 Drawing Sheets

LIQUID CRYSTAL DEVICE AND LIQUID CRYSTAL DISPLAY APPARATUS

FIELD OF THE INVENTION AND RELATED ART

The present invention relates to a liquid crystal device for use in light-valves for flat-panel displays, projection displays, printers, etc., and a liquid crystal display apparatus including the liquid crystal device.

As a type of a nematic liquid crystal display device used heretofore, there has been known an active matrix-type liquid crystal device wherein each of pixels is provided with an active element (e.g., a thin film transistor (TFT)).

As a nematic liquid crystal material used for such an active matrix-type liquid crystal device using a TFT, there has been presently widely used a twisted nematic (TN) liquid crystal as disclosed by M. Schadt and W. Helfrich, "Applied Physics Letters", Vol. 18, No. 4 (Feb. 17, 1971), pp. 127–128.

In recent years, there has been proposed a liquid crystal device of In-Plain Switching mode utilizing an electric field applied in a longitudinal direction of the device, thus improving a viewing angle characteristic being problematic in TN-mode liquid crystal displays. Further, a liquid crystal device of a super twisted nematic (STN) mode without using the active element (TFT etc.) has also be known as a representative example of the nematic liquid crystal display device.

Accordingly, the nematic liquid crystal display device includes various display or drive modes. In any mode however, the resultant nematic liquid crystal display device has encountered a problem of a slow response speed of several ten milliseconds or above.

In order to solve the above-mentioned difficulties of the conventional types of nematic liquid crystal devices, a liquid crystal device using a liquid crystal exhibiting bistability ("SSFLC", Surface Stabilized FLC), has been proposed by Clark and Lagerwall (Japanese Laid-Open Patent Application (JP-A) 56-107216, U.S. Pat. No. 4,367,924). As the liquid crystal exhibiting bistability, a chiral smectic liquid crystal or a ferroelectric liquid crystal (FLC) having chiral smectic C phase (SmC*) is generally used. Such a chiral smectic (ferroelectric) liquid crystal has a very quick response speed because it causes inversion switching of liquid crystal molecules by the action of an applied electric field on spontaneous polarizations of their liquid crystal molecules. In addition, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area.

In recent years, as another liquid crystal material, an antiferroelectric liquid crystal showing tristability (tristable states) has caught attention. Similarly as in the ferroelectric liquid crystal, the antiferroelectric liquid crystal causes molecular inversion switching based on the action of an applied electric field on its spontaneous polarization, thus providing a very high-speed responsiveness. This type of the liquid crystal material has a molecular alignment (orientation) structure wherein liquid crystal molecules cancel or counterbalance their spontaneous polarizations each other under no electric field application, thus having no spontaneous polarization in the absence of the electric field. Further, there has also been proposed a threshold-less antiferroelectric liquid crystal developed for driving an active matrix-type liquid crystal device.

The above-mentioned ferroelectric and antiferroelectric liquid crystal causing inversion switching based on spontaneous polarization are liquid crystal materials assuming smectic phase (chiral smectic liquid crystals). Accordingly, by using these liquid crystal materials capable of solving the problem of the conventional nematic liquid crystal materials in terms of response speed, it has been expected to realize a smectic liquid crystal display device.

As described above, the (anti-)ferroelectric liquid crystal has been expected to be suitable for use in displays exhibiting a high-speed response performance.

In the case of the above-mentioned device (cell) using an SSFLC, however, the device can basically effect only a display of two (display) levels, thus being difficult to effect a gradation display in each pixel.

In recent years, in order to allow a mode of controlling various gradation levels, there have been proposed liquid crystal devices using specific chiral smectic liquid crystals, such as a ferroelectric liquid crystal of a short pitch-type, a polymer-stabilized ferroelectric liquid crystal and an antiferroelectric liquid crystal showing no threshold (voltage) value. However, these devices have not been put into practical use sufficiently.

Further, such a chiral smectic liquid crystal allowing gradational display generally has a very large spontaneous polarization. For instance, a threshold-less liquid crystal exhibiting a V-shaped voltage-transmittance (V-T) characteristic (such that a transmittance continuous varies depending on an applied voltage so as to provide a V-shape between positive and negative saturation voltages) has a very large spontaneous polarization, thus exerting a large load on an active matrix-drive device.

Accordingly, such a threshold-less liquid crystal exhibiting a V-shaped V-T characteristic is required to be decreased in spontaneous polarization value.

SUMMARY OF THE INVENTION

In view of the above-mentioned circumstances, an object of the present invention is to provide a liquid crystal device using a chiral smectic liquid crystal having a relatively small spontaneous polarization, capable of performing a gradation level control.

Another object of the present invention is to provide a liquid crystal display apparatus including the liquid crystal device.

According to the present invention, there is provided a liquid crystal device, comprising: a chiral smectic liquid crystal and a pair of substrates sandwiching the chiral smectic liquid crystal therebetween and each having thereon an electrode for applying a voltage to the liquid crystal, at least one of the substrates being provided with a uniaxial treating axis for aligning the liquid crystal, wherein at least one of the substrates is provided with an alignment control film comprising a polyimide represented by a recurring unit of the following formula (I):

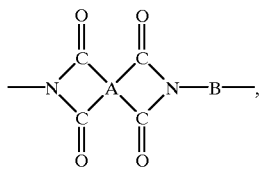

(I)

in which A represents a tetravalent group comprising an aromatic ring, an aromatic polycyclic ring, a heterocyclic ring or a condensed polycyclic ring; and B represents a divalent aliphatic group comprising an alicyclic ring or $-(Ph)_a-(O)_c-(CH_2)_x-(D)_e-(CH_2)_y-(O)_d-(Ph)_b-$ where Ph represents a phenylene group; D represents $-CR_1(R_2)-$ in which $R_1$ and $R_2$ independently denote hydrogen or methyl group; a and b are 0 or 1 at the same time; c and d are 0 at the same time when a=b=0 or are 0 or 1 at the same time when a=b=1; e is 0 or 1; and x and y are independently an integer of at least 1 but satisfy x+y+e=2–10, the liquid crystal exhibits a phase transition series including at least smectic A phase and chiral smectic phase and assumes a bistable alignment state in its chiral smectic temperature range when incorporated in a test cell including a pair of substrates each having thereon a 70 nm-thick ITO (indium-tin-oxide) film so that the liquid crystal is disposed between the ITO films to provide a cell gap of 2.4 μm and the test cell is gradually cooled from isotropic liquid to smectic A phase and subjected to a shearing treatment in a temperature range of smectic A phase, and in said chiral smectic temperature range wherein the liquid crystal assumes the bistable alignment state in the test cell, the liquid crystal disposed between the substrates at least one of which is provided with the alignment film of the polyimide has alignment characteristic and voltage-transmittance characteristic such that liquid crystal molecules, under no electric field, are aligned to provide an average molecular axis substantially coinciding with an average uniaxial aligning treatment axis and/or a bisector of a maximum angle formed between two extreme molecular axes established under application of an electric field but are respectively tilted from the average uniaxial aligning treatment axis and/or the bisector of the maximum angle to provide at least two molecular axes coinciding with the two extreme molecular axes or located therebetween and under application of an electric field, are tilted to provide an effective tilt angle and a transmittance that continuously change depending on an electric field applied thereto.

According to the present invention, there is also provided a liquid crystal display apparatus including the above-mentioned liquid crystal device, a drive circuit for driving the liquid crystal device and a light source.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
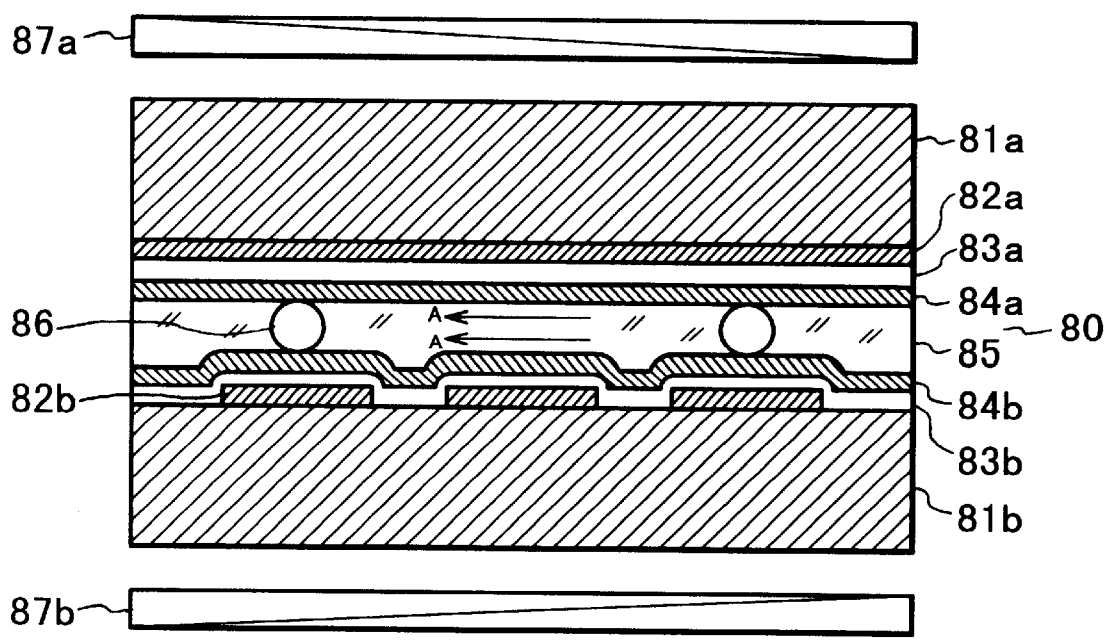
FIG. 1 is a schematic sectional view showing an embodiment of the liquid crystal device according to the present invention.

According to the liquid crystal device of the present invention, a chiral smectic liquid crystal used assumes a bistability (bistable alignment characteristic) in the above-mentioned (typical) test cell but assumes a prescribed alignment characteristic in the liquid crystal device (of the present invention).

More specifically, the prescribed alignment characteristic in the liquid crystal device (not in the test cell) is such that liquid crystal molecules under no electric field are aligned to provide an average molecular axis substantially coinciding with an average uniaxial aligning treatment axis and/or a bisector of a maximum angle formed between two extreme molecular axes established under electric field application and under electric field application in combination with a pair of cross-nicol polarizers sandwiching the liquid crystal device, are tilted from the bisector to provide an effective tilt angle and a transmittance that continuously change depending on magnitude and polarity of an electric field applied thereto (applied voltage), thus stably providing a V-shaped voltage-transmittance (V-T) characteristic (such that a transmittance (T=0%) under no voltage application continuously increases with an increasing magnitude (absolute value) of the applied voltage between positive and negative saturation voltage (proving T=100%) on both the positive-polarity side and the negative-polarity side as shown in FIGS. 4, 5, 10 and 11) (hereinbelow, sometimes referred to as "V-shaped V-T (or response) characteristic (curve)").

As a result, it is possible to realize a liquid crystal device (or display apparatus) with good display characteristics driven in accordance with an active-matrix drive mode based on the V-shaped V-T characteristic as described above with respect to a chiral smectic liquid crystal having a relatively small spontaneous polarization (when compared with conventional (threshold-less) chiral smectic liquid crystal materials providing a V-shaped V-T characteristic) and having bistability in a test cell by appropriately selecting and controlling a chiral smectic liquid crystal material used and a device (cell) structure (including some treatments thereto).

Herein, a direction of the "average uniaxial aligning treatment axis" means a uniaxial aligning treatment axis direction in the case where only one of the pair of substrates is subjected to a uniaxial aligning treatment or an extension direction of two parallel uniaxial aligning treatment axes in the case where both of the pair of substrates are subjected to a uniaxial aligning treatment so that their uniaxial aligning treatment axes are parallel to each other and in the same direction or opposite directions (parallel relationship or anti-parallel relationship). Further, in the case where both of the substrates are subjected to a uniaxial aligning treatment so that their uniaxial aligning treatment axes intersect each other at a crossing angle, the "average uniaxial aligning treatment axis" direction means a direction of a bisector of the uniaxial aligning treatment axes (a half of the crossing angle).

Hereinbelow, a preferred embodiment of the liquid crystal device of the present invention will be described with reference to the drawings.

FIG. 1 shows a schematic sectional view of a liquid crystal device 80 according to the present invention.

The liquid crystal device 80 includes a pair of substrates 81a and 81b; electrodes 82a and 82b disposed on the substrates 81a and 81b, respectively; insulating films 83a and 83b disposed on the electrodes 82a and 82b, respectively; alignment control films 84a and 84b disposed on the insulating films 83a and 83b, respectively; a liquid crystal 85 disposed between the alignment control films 84a and 84b; a spacer 86 disposed together with the liquid crystal 85 between the alignment control films 84a and 84b; and a pair of polarizers 87a and 87b sandwiching the pair of substrates 81a and 81b with polarizing axes disposed perpendicular to each other (cross-nicol relationship).

The liquid crystal 85 shows chiral smectic phase.

Each of the substrates 81a and 81b comprises a transparent material, such as glass or plastics, and is coated with, e.g., a plurality of stripe electrodes 82a (82b) of $In_2O_3$ or ITO (indium tin oxide) for applying a voltage to the liquid crystal 85. These electrodes 82b and 82b intersect each other to form a matrix electrode structure, thus providing a simple matrix-type liquid crystal device. As a modification of the electrode structure, one of the substrates 81a and 81b may be provided with a matrix electrode structure wherein dot-shaped transparent electrodes are disposed in a matrix form and each of the transparent electrodes is connected to a switching element, such as a TFT (thin film transistor) or MIM (metal-insulator-metal), and the other substrate may be provided with a counter (common) electrode on its entire surface, thus constituting an active matrix-type liquid crystal device.

On the electrodes 82a and 82b, the insulating films 83a and 83b, e.g., of $SiO_2$, $TiO_2$ or $Ta_2O_5$ having a function of preventing an occurrence of short circuit may be disposed, respectively, as desired.

On the insulating films 83a and 83b, the alignment control films 84a and 84b are disposed so as to control the alignment state of the liquid crystal 85 contacting the alignment control films 84a and 84b. At least one of the alignment control films 84a and 84b is subjected to a uniaxial aligning treatment (e.g., rubbing). Such an alignment control film 84a (84b) may be prepared by forming a film of an organic material (such as polyimide, polyimideamide, polyamide or polyvinyl alcohol) through wet coating with a solvent, followed by drying and rubbing (e.g., in the direction of arrows A in FIG. 1) or by forming a deposited film of an inorganic material through an oblique vapor deposition such that an oxide (e.g., SiO) or a nitride is vapor-deposited onto a substrate in an oblique direction with a prescribed angle to the substrate.

In the present invention, in order to stably provide the above-mentioned V-shaped V-T characteristic, at least one of the alignment control films 84a and 84b comprises a film of a polyimide represented by a recurring unit of the following formula (I):

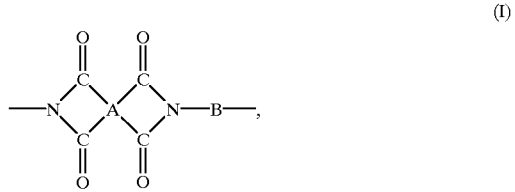

in which A represents a tetravalent group comprising an aromatic ring, an aromatic polycyclic ring, a heterocyclic ring or a condensed polycyclic ring; and B represents a divalent aliphatic group comprising an alicyclic ring or $-(Ph)_a-(O)_c-(CH_2)_x-(D)_e-(CH_2)_y-(O)_d-(Ph)_b-$ where Ph represents a phenylene group; D represents

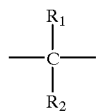

in which $R_1$ and $R_2$ independently denote hydrogen or methyl group; a and b are 0 or 1 at the same time; c and d are 0 at the same time when a=b=0 or are 0 or 1 at the same time when a=b=1; e is 0 or 1; and x and y are independently an integer of at least 1 but satisfy x+y+e=2–10.

The above polyimide alignment control film of the formula (I) may preferably be provided with a uniaxial aligning performance by rubbing etc.

In the present invention, the alignment control film (preferably the polyimide alignment control film of the formula (I) described above) may desirably have a surface potential (as absolute value) of at most 200 mV, particularly at most 100 mV. This may be attributable to an interaction between the surface potential of the alignment control film and a spontaneous polarization of a (chiral smectic) liquid crystal material used. More specifically, a smaller surface potential (poor charging state) is presumably considered to less affect the interaction with the spontaneous polarization, thus suppressing formation of the bistable alignment state largely affected by the interaction of the alignment characteristic (of the alignment control film) with the spontaneous polarization (of the liquid crystal material used).

In the above formula (I) representing the recurring unit of the polyimide alignment control film used in the present invention, it is preferred that a=b=c=d=e=0 and x+y is an integer of 2–10. It is also preferred that a=b=c=d=1 and x+y+e is an integer of 2–10. Further, a polyimide alignment control film of the formula (I) wherein a=b=1, c=d=e=0 and x+y is an integer of 2–10 is also preferred.

Specific examples of the polyimide alignment control film of the formula (I) are shown below.

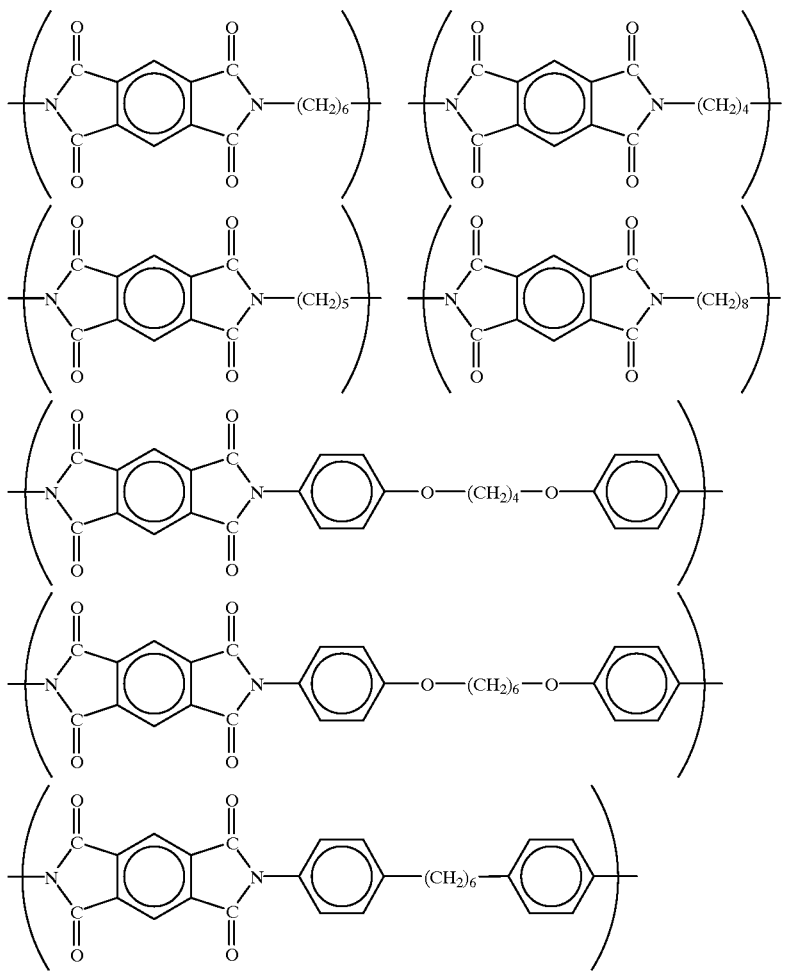

The above-mentioned polyimide alignment control film of the formula (I) may preferably be subjected to uniaxial aligning treatment, particularly rubbing.

In the case where both of the alignment control films 84a and 84b are subjected to the uniaxial aligning treatment (rubbing), the respective uniaxial aligning treatment (rubbing) directions may appropriately be set in a parallel relationship, an anti-parallel relationship or a crossed relationship providing a crossing angle therebetween of at most 45 degrees, depending on the liquid crystal material used.

The substrates 81a and 81b are disposed opposite to each other via the spacer 86 comprising e.g., silica beads for determining a distance (i.e., cell gap) therebetween, preferably in the range of 0.3–10 μm, in order to provide a uniform uniaxial aligning performance and such an alignment state that an average molecular axis of the liquid crystal molecules under no electric field application is substantially aligned with an average uniaxial aligning treatment axis (or a bisector of two uniaxial aligning treatment axes) although the cell gap varies its optimum range and its upper limit depending on the liquid crystal material used.

In addition to the spacer 86, it is also possible to disperse adhesive particles of a resin (e.g., epoxy resin) between the substrates 81a and 81b (not shown in FIG. 1) in order to improve adhesiveness therebetween and an impact (shock) resistance of the liquid crystal having chiral smectic phase (Sm*).

In the present invention, a material and composition of the chiral smectic liquid crystal 85 are important factors in realization of the above-described alignment and V-T characteristics.

The liquid crystal material used as the liquid crystal 85 may preferably comprise a mesomorphic compound or composition of two or more mesomorphic compounds. The mesomorphic compound(s) may preferably exhibit a strong intermolecular interaction between smectic molecular layers in chiral smectic phase.

The liquid crystal material used in the present invention exhibits bistability (bistable alignment state) at a boundary with a surface free from a microscopic (alignment-) regulating force as in the above-mentioned test cell free from an alignment control film.

On the other hand, in most of conventional cases, a liquid crystal material providing the above-mentioned V-shaped V-T characteristic generally assumes anti-ferroelectricity in a state free from a microscopic regulating force (e.g., when kept in contact with a free-standing film (a film having no alignment control force) and has a considerably large spontaneous polarization. This also holds in the case of a boundary surface having no microscopic regulating force.

In the present invention, by using a liquid crystal material having a relatively small spontaneous polarization and assuming bistability in the test cell free from microscopic alignment regulating force in combination with the above-mentioned polyimide alignment control film of the formula (I), it is possible to provide alignment characteristic and voltage-transmittance characteristic such that liquid crystal molecules, under no electric field, are aligned to provide an average molecular axis substantially coinciding with an average uniaxial aligning treatment axis and/or a bisector of a maximum angle formed between two extreme molecular axes established under application of an electric field but are respectively tilted from the average uniaxial aligning treatment axis and/or the bisector of the maximum angle to provide at least two molecular axes coinciding with the two extreme molecular axes or located therebetween and under application of an electric field, are tilted to provide an effective tilt angle and a transmittance that continuously change depending on magnitude and polarity of an electric field applied thereto.

The chiral smectic liquid crystal used in the present invention may preferably have a spontaneous polarization of at most 200 nC/cm$^2$, more preferably at most 100 nC/cm$^2$, further preferably at most 50 nC/cm$^2$, in order to reduce a load exerted on a drive circuit. As a result, it is possible to realize a chiral smectic liquid crystal device decreased in load on a drive circuit, thus allowing a good gradational display based on the above-mentioned V-shaped V-T characteristic.

Preferred examples of the chiral smectic liquid crystal may include:

(1) a compound having a partial structure represented by the following formula (II):

—COOC*HX$_1$—R$_1$    (II), in which X$_1$ represents —CH$_3$ or —CF$_3$ and R$_1$ represents an alkyl group having 1–20 carbon atoms optionally substituted with O or S;

(2) a fluorine-containing compound having a fluorocarbon terminal portion, a hydrocarbon terminal portion, and a central core connecting the fluorocarbon and hydrocarbon terminal portions; and (3) a compound having a central core and two terminal portions each connected with the central core, at least one of, preferably one of, the terminal portions having a terminal group substituted by —CN, —OH, —COOH, —CF$_3$, —F, —NH$_2$ or a phenyl group which is optionally substituted with an alkyl group having 1–5 carbon atoms, an alkoxy group having 1–5 carbon atoms, halogen, —CF$_3$ or —CN.

The compound of (2) may more preferably comprise a fluorine-containing chiral mesomorphic compound comprising:

a) a fluorocarbon terminal portion having at least one methylene group and optionally having at least one catenary ether oxygen, b) a chiral or achiral saturated hydrocarbon terminal portion, and c) a central core connecting the fluorocarbon and hydrocarbon terminal portions; or an achiral compound comprising a fluorocarbon terminal portion having at least one catenary ether oxygen and a hydrocarbon terminal portion connected by a central core with the fluorocarbon terminal portion.

Examples and synthesis processes for the compound of (1) may, e.g., by described in JP-A 6-329591 (particularly compounds shown in Tables 1–15) and JP-A 7-316555 (particularly compounds shown in Tables 1-1 to 1-18).

Examples and synthesis processes for the compound of (2) may, e.g., by described in JP-A 63-27451 (particularly compounds shown in Table 1) JP-A 2-142753 (U.S. Pat. No. 5082587) (particularly compounds shown in Table 1) and International Laid-Open Patent Application WO96/3325 (particularly compounds shown in Table 1).

Examples and synthesis processes for the compound of (3) may, e.g., by described in JP-A 7-118178 (particularly compounds (I-1) to (I-180) JP-A 6-256231 (particularly compounds (I-1) to (I-223)).

Specific examples of the chiral smectic liquid crystal used in the present invention are shown below.

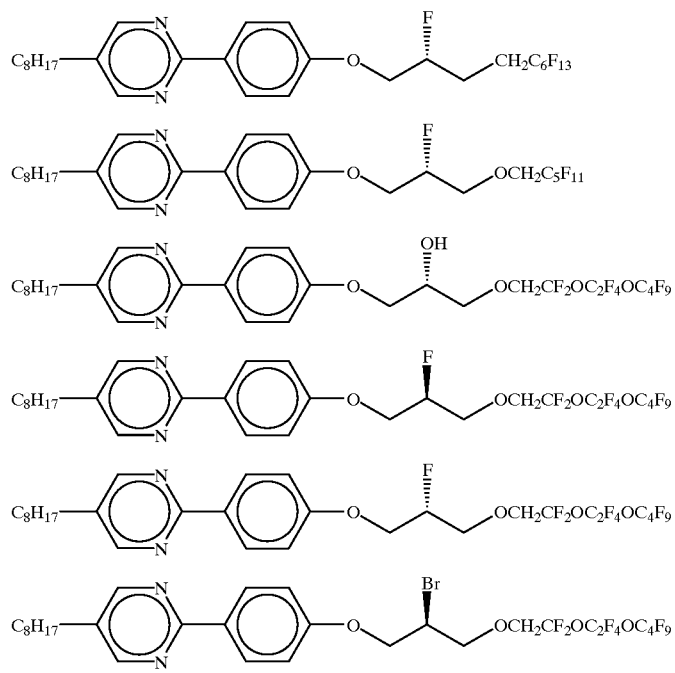

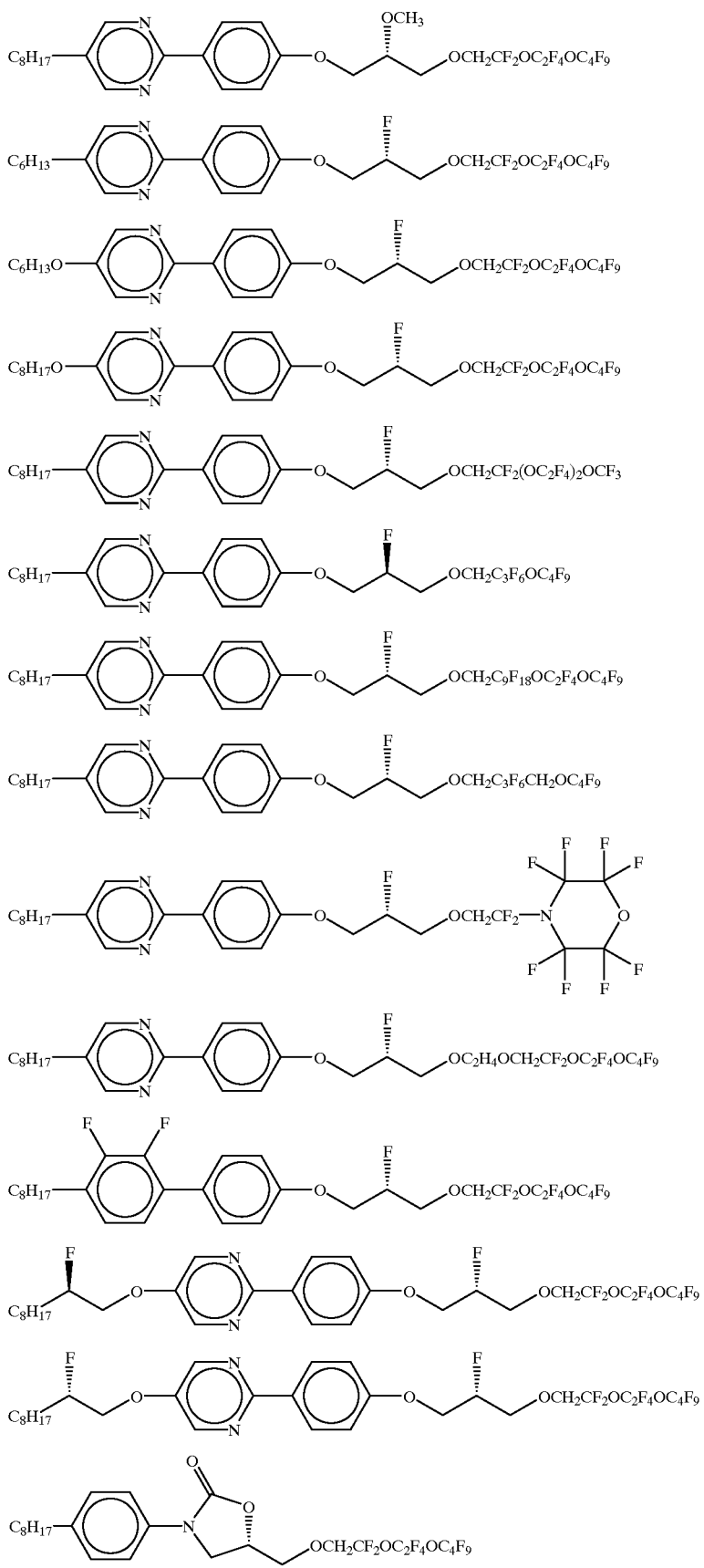

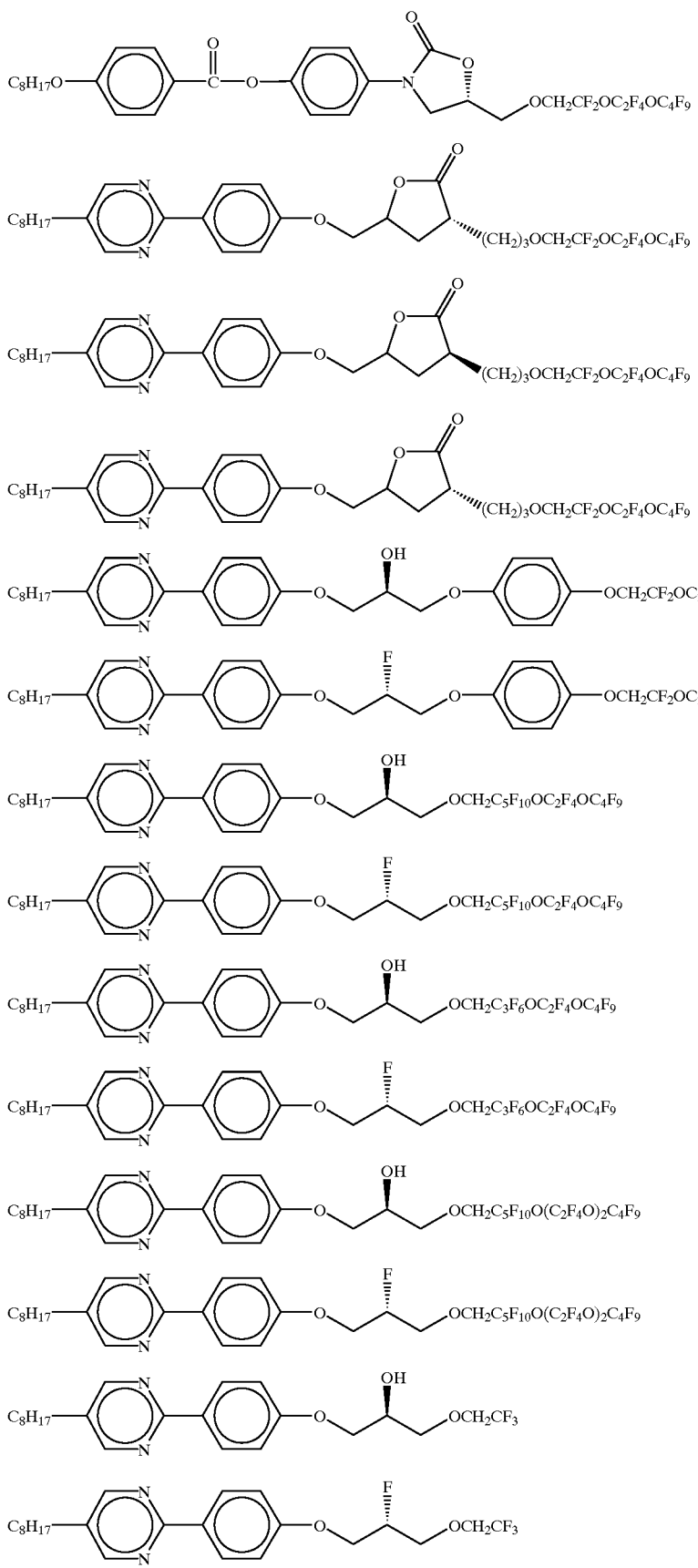

-continued
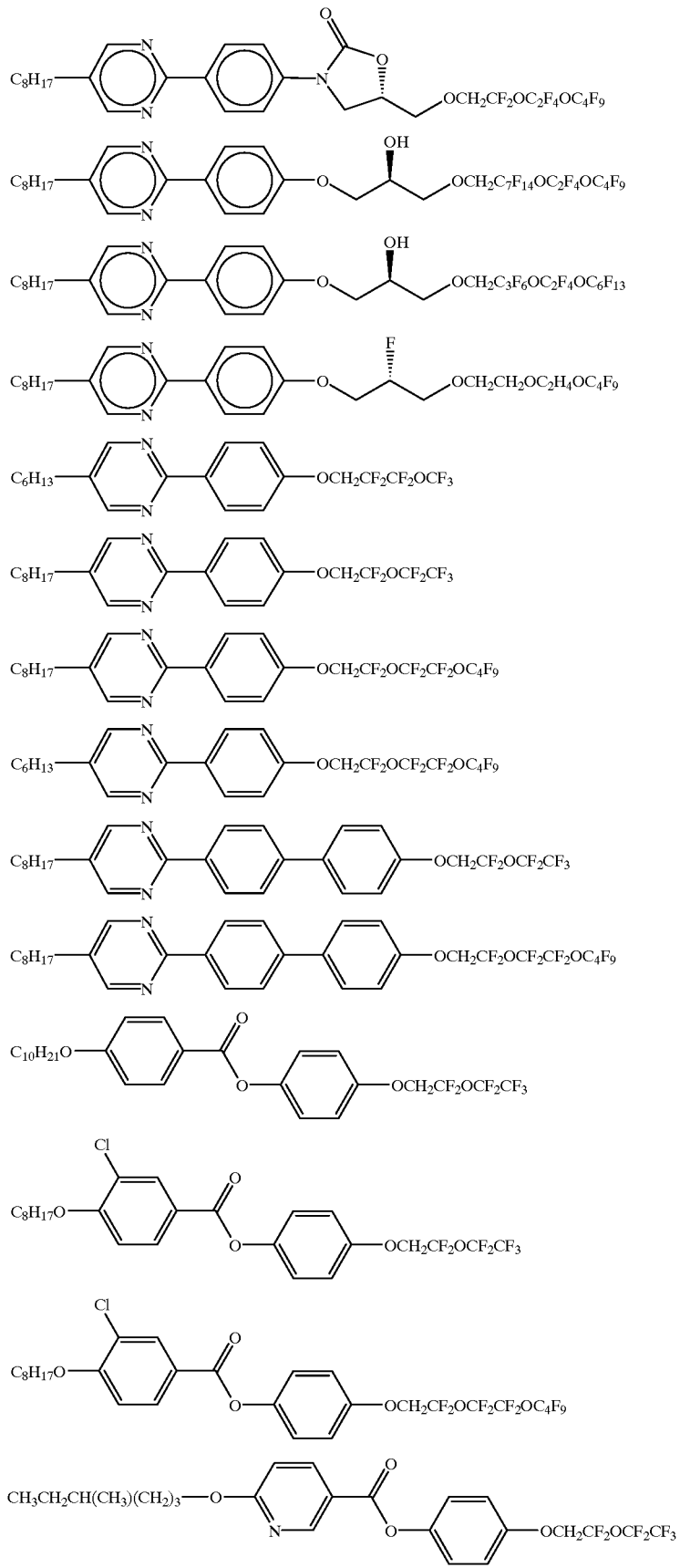

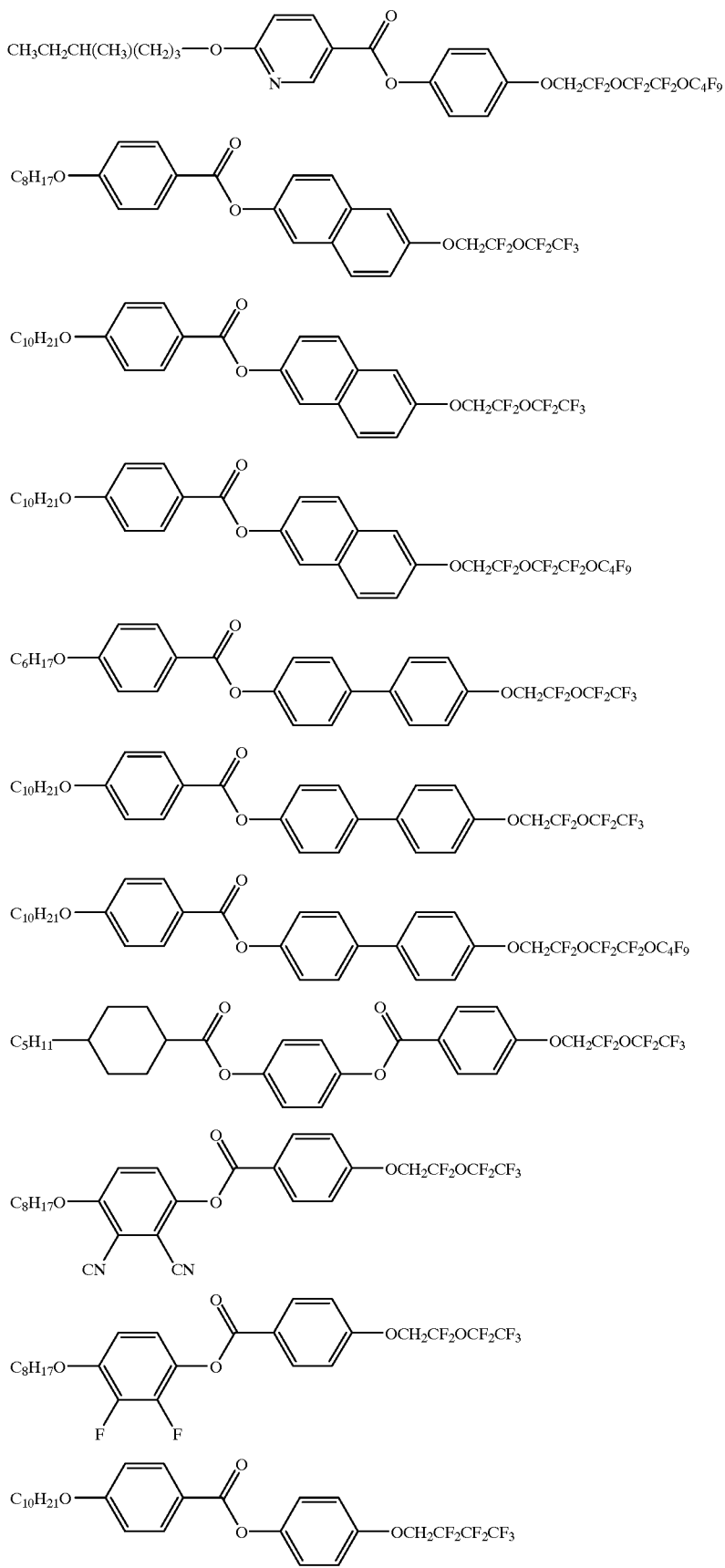

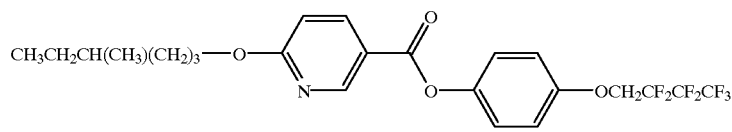
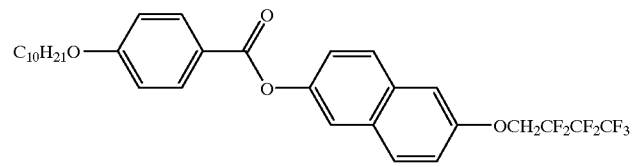
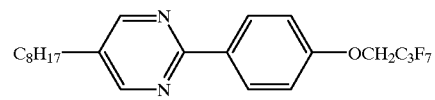
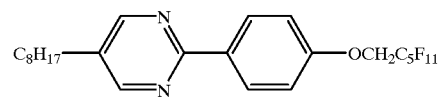
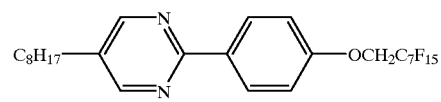
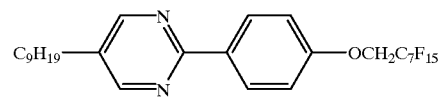
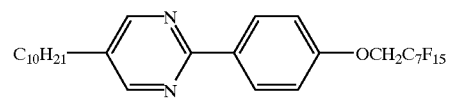
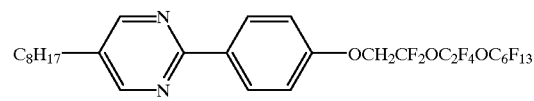
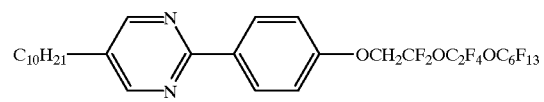
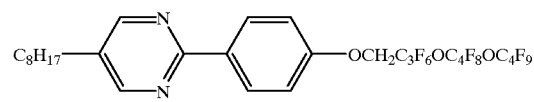
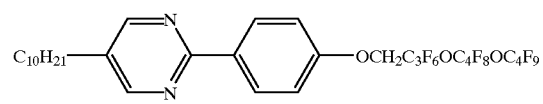
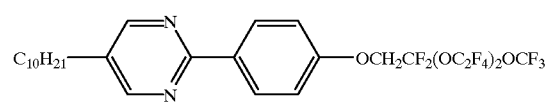
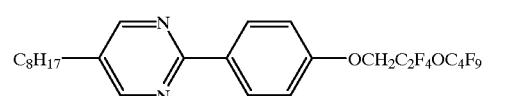
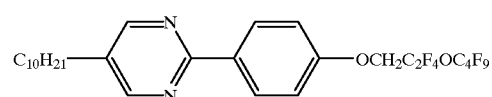

-continued
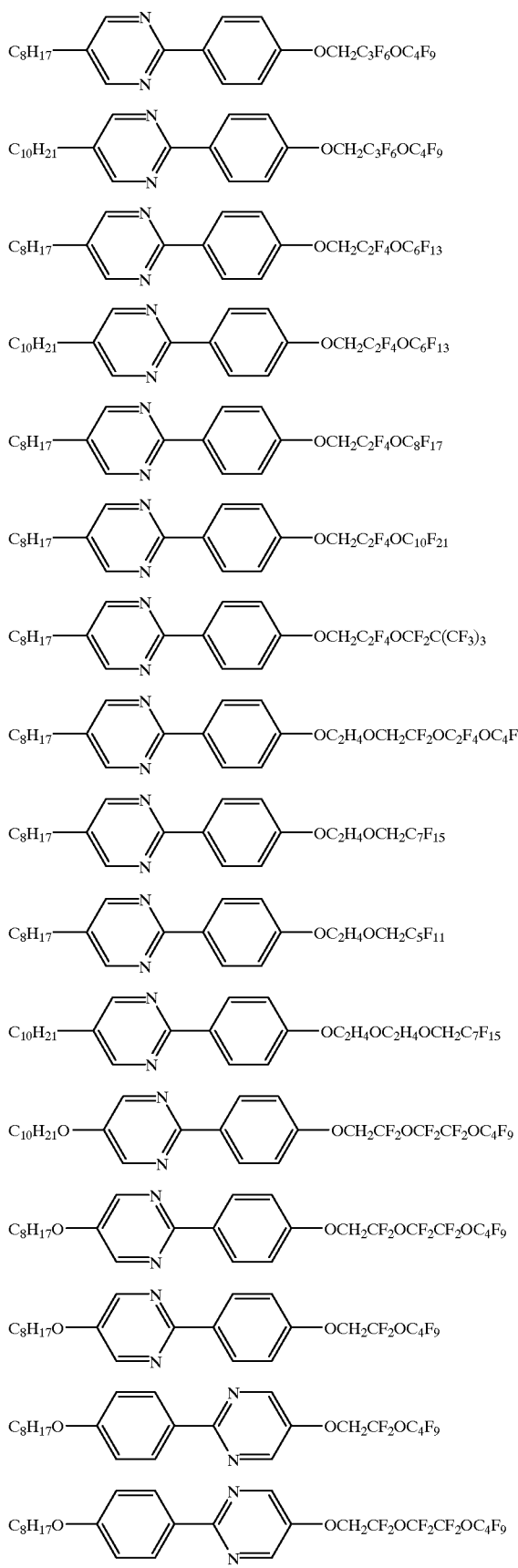

-continued

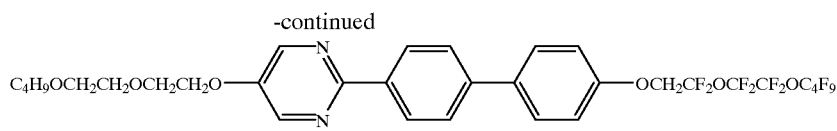

Hereinbelow, a mechanism of a liquid crystal alignment (orientation) in the liquid crystal device according to the present invention will be described with reference to FIGS. 2 and 3 based on a microscopic assumption.

The above-mentioned liquid crystal material used in the liquid crystal device of the present invention comprises a liquid crystal (mesomorphic) compound showing a strong intermolecular interaction between adjacent molecular layers in chiral smectic phase (particularly chiral smectic C phase) or a liquid crystal composition containing the mesomorphic compound.

Such a liquid crystal compound comprises a plurality of liquid crystal molecules each generally represented by the following formula (III):

wherein A and C are independently a terminal portion having a high flexibility and B is a mesomorphic core portion comprising two to four rings having a high rigidity.

Figure 2:
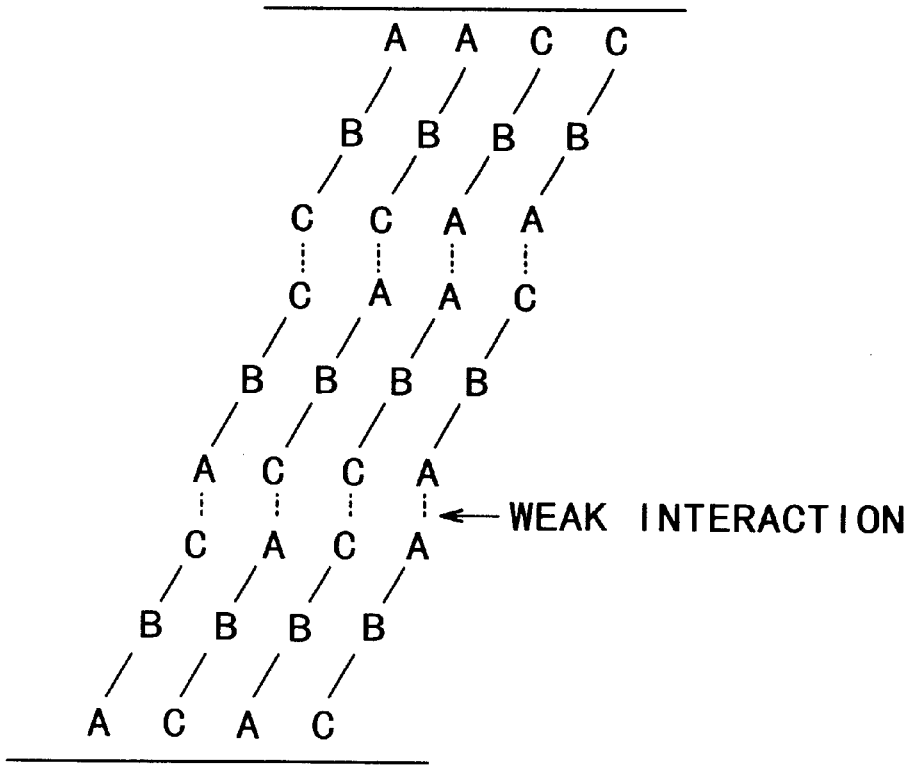
FIG. 2 schematically illustrates a liquid crystal molecular alignment (orientation) state in an ordinary liquid crystal device and FIG. 3 schematically illustrates a liquid crystal molecular alignment state in the liquid crystal device of the present invention.

Assuming that an intermolecular interaction between liquid crystal molecular layers is weak and intermolecular interactions between A—A, C—C, and A-C, respectively are substantially equivalent to each other, as shown in FIG. 2, the liquid crystal molecules are aligned in a cell so that directions of their C-directions are in an identical direction (i.e., parallel to each other), thus assuming bistability (bistable alignment state).

Further, assuming that an intermolecular interactions between A—A and C—C are strong, respectively, but an intermolecular interaction between A-C is weak, the liquid crystal molecules also assumes bistability by adopting a shearing treatment in the test cell as described above.

Figure 3:
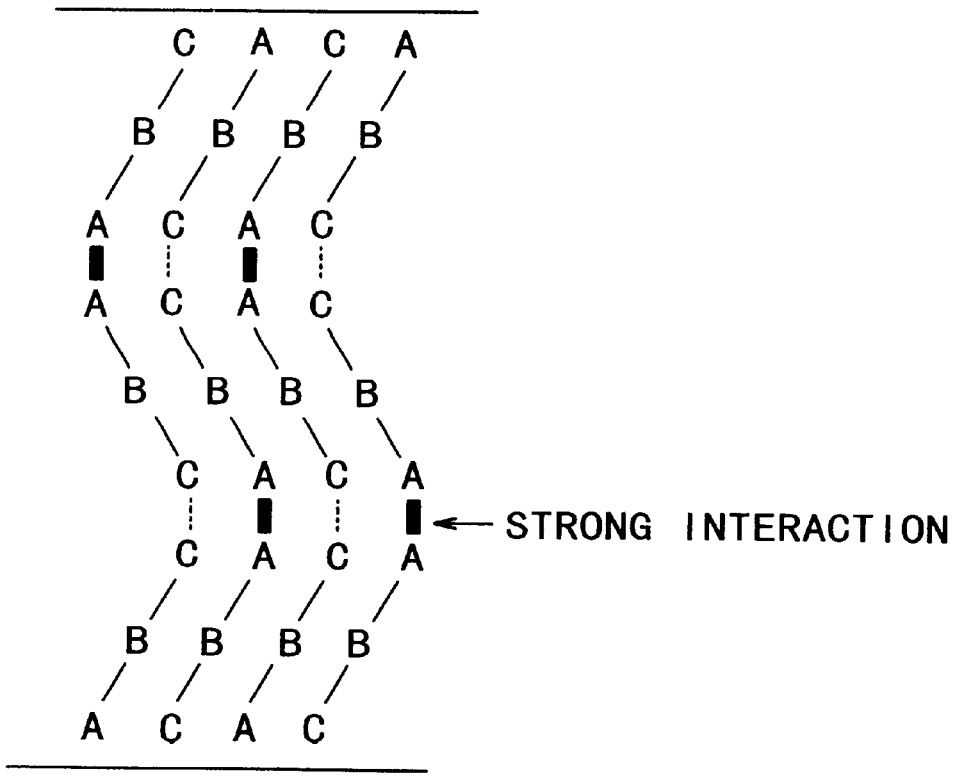

However, in the case of appropriately selecting and setting a cell structure or constitution, as shown in FIG. 3, liquid crystal molecules located in the vicinity of a boundary with a substrate form a particular layer structure in a temperature range assuming chiral smectic C phase since the intermolecular interaction between A—A or C—C is preferentially developed at least between adjacent molecular layers. In such a particular layer structure, the liquid crystal molecules are aligned so that directions of their C-directors are alternately changed for each molecular layer (as shown in FIG. 3) or randomly changed, thus losing bistability as developed in the shearing-treated test cell.

As a result, a liquid crystal disposed between a pair of substrates at least one of which is provided with the above-mentioned alignment film of the polyimide of the formula (I) has alignment characteristic and voltage-transmittance characteristic such that liquid crystal molecules, under no electric field, are considered to be aligned to provide an average molecular axis substantially coinciding with an average uniaxial aligning treatment axis and/or a bisector of a maximum angle formed between two extreme molecular axes established under application of an electric field but are respectively tilted from the average uniaxial aligning treatment axis and/or the bisector of the maximum angle to provide at least two molecular axes coinciding with the two extreme molecular axes or located therebetween. Further, in combination with a pair of polarizers arranged so as to provide an extinction position coinciding with an average uniaxial aligning treatment axis, under application of an electric field, the liquid crystal molecules are considered to be tilted to provide an effective tilt angle and a transmittance that continuously change depending on an electric field applied thereto.

Particularly, in the case where the liquid crystal compound is used in combination with an alignment control film of a polyimide represented by a recurring unit of the formula (I) having at least two alkylene groups or an aliphatic group containing an alicyclic ring, the polyimide alignment control film partially resembles in chemical structure and shows a high compatibility with the liquid crystal compound due to contribution of the partial resemblance portion. As a result, compared with an ordinary alignment control film, the polyimide alignment control film is considered to be more effective in incorporation of the liquid crystal molecules therein and molecular-structural entanglement thereof with the liquid crystal molecules. Based on such effects induced by the partial structural resemblance between the polyimide alignment control film and the liquid crystal molecules at the boundary therebetween, the molecules of the chiral smectic liquid crystal having the characteristic features as described above are aligned to provide the above-mentioned alignment characteristic under no electric field.

In the present invention, by using a drive circuit for supplying gradation signals to the above-mentioned liquid crystal device and a light source for illuminating the liquid crystal device in combination with the liquid crystal device, it is possible to provide a liquid crystal display apparatus allowing gradational display particularly based on the above-described V-T characteristic such that the effective tilt angle and transmittance continuously change depending on the electric field applied to the liquid crystal. For example, it is possible to effect an analog-like gradational display by employing an active matrix substrate provided with, e.g., TFTs as one of the pair of substrates (of a resultant liquid crystal device) and driving the liquid crystal device according to an active matrix driving scheme based on amplitude modulation by the drive circuit.

Hereinbelow, the present invention will be described more specifically based on examples.

EXAMPLE 1

In this example, three chiral smectic liquid crystals LC-1, LC-2 and LC-3 shown below were used.

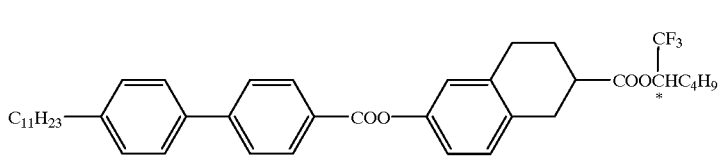
<LC-1>

Phase transition temperature (° C.)

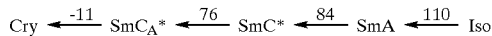

Spontaneous polarization (30° C.): 165 nC/cm$^2$
Tilt angle (30° C.): 28 degrees

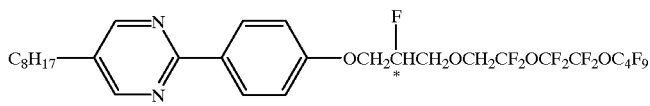
<LC-2>

Phase transition temperature (° C.)

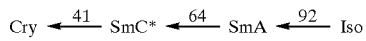

Spontaneous polarization (44° C.): 101 nC/cm$^2$
Tilt angle (44° C.): 26 degrees

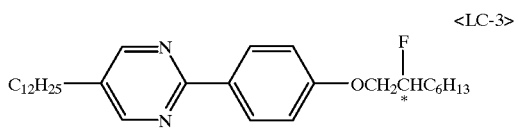
<LC-3>

Phase transition temperature (° C.)

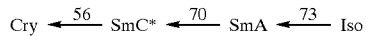

Spontaneous polarization (60° C.): 64 nC/cm$^2$
Tilt angle (60° C.): 20 degrees

The above phase transition temperatures on temperature decrease and physical and optical properties (including those described hereinafter) of the liquid crystals (LC-1, LC-2 and LC-3) were measured or determined based on DSC (differential scanning calorimetry) and texture observation through a polarizing microscope and electrooptical response measurement with respect to a shearing-alignment cell (test cell) described below.

(Alignment state of liquid crystal in shearing-alignment cell)

Each of three blank cells (for shearing-alignment cells) was prepared in the following manner.

A pair of 1.1 mm-thick glass substrates each coated with a ca. 70 nm-thick ITO (indium-tin-oxide) film having a cleaned surface (0.9 cm$^2$ in planar area) was prepared.

On one of the substrates, a 0.01 wt. %-dispersion of silica beads (having an average particle size of 2.4 μm) in isopropyl alcohol (IPA) was applied by spin coating at 1500 rpm for 10 sec to be dispersed at a density of ca. 100 (particles)/mm$^2$.

The thus-treated substrate and the other substrate were applied to each other with a cell gap of 2.2 μm so that the ITO films were disposed opposite to each other and one of the substrates was disposed movably in a parallel direction relative to the other substrate while retaining the cell gap so as to exert a shearing force on a liquid crystal layer (i.e., shearing treatment).

Into the thus-prepared blank cell, each of the liquid crystals LC-1, LC-2 and LC-3 was injected at its isotropic liquid temperature. Each of the resultant cells was placed on a hot stage ("FP82", mfd. by Mettler Co.) and gradually cooled from the isotropic liquid temperature to a temperature (in SmA) ca. 5° C. below a phase transition temperature from Iso to SmA while controlling the temperature by a temperature controller ("FP80HT", mfd. by Mettler Co.). At this time, in all the (three) cells, a random alignment texture was observed.

Then, each of the cells was subjected to a shearing treatment by applying a shearing force to the liquid crystal layer in a SmA temperature range while retaining the cell gap by the spacer (silica) beads. Specifically, the shearing force was exerted on the liquid crystal layer by moving one of the substrates 1.5 reciprocations within 3 sec. in a parallel direction relative to the other substrate, thus effecting the shearing treatment to prepare a shearing-alignment (test) cell.

During the shearing treatment, it was confirmed that smectic layers were gradually formed perpendicularly to the substrates to change the random alignment texture into a monodomain texture, thus providing a uniform homogeneous alignment state.

Thereafter, each of the test cells was further gradually cooled to SmC* temperature (80° C. for the test cell using LC-1, 50° C. for the test cell using LC-2 and 60° C. for the test cell using LC-3), followed by texture observation and electrooptical response measurement through a polarizing microscope (magnification=200).

As a result, all the liquid crystals LC-1, LC-2 and LC-3 were found to provide an alignment state wherein optically stable two states (bistable states) were co-present in mixture as observed in an ordinary liquid crystal device including a ferroelectric liquid crystal. Similarly, an optical response to a voltage applied to each of the liquid crystals was also based on ferroelectricity as observed in the ordinary (ferroelectric) liquid crystal device.

(Preparation of liquid crystal device)

For blank cells A-1, A-2, B-1 and B-2 were prepared in the following manner.

<Black cell A-1>

Two 1.1 mm-thick glass substrates were each coated with a ca. 70 nm-thick ITO film (0.9 cm² in planar area) as a transparent electrode.

On each of the thus-coated substrates, a 0.75 wt. %-solution of a polyimide precursor (polyamic acid) for forming a polyimide represented by a recurring unit shown below was spin-coated at 500 rpm for 5 sec (as 1st coating) and at 1500 rpm for 30 sec (as 2nd coating).

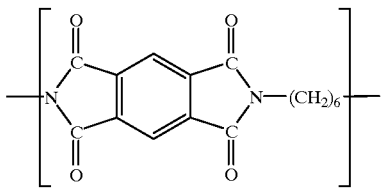

Thereafter, each of the thus-treated substrates was pre-dried at 80° C. for 5 min., followed by hot-baking at 200° C. for 1 hour to obtain a 10 nm-thick polyimide film.

Each of the thus-obtained polyimide films was subjected to rubbing treatment (as a uniaxial aligning treatment) with a nylon cloth under the following conditions to provide an alignment control film.

Pressing depth: 0.3 mm
Substrate feed rate: 10 cm/sec
Roller rotation speed: 1000 rpm
Substrate feed: 4 times Then, on one of the substrates, a 0.01 wt. %-dispersion of silica beads (average particle size 1.3 μm) in IPA was spin-coated at 1500 rpm for 10 sec at a dispersion density of ca. 100 (particles)/mm² followed by application of a thermosetting liquid adhesive through a printing process.

The thus-obtained two substrates were applied to each other so that their rubbing axes were in parallel with each other and directed in an identical direction, followed by heating for curing the thermosetting liquid adhesive in an oven at 150° C. for 90 min. to prepare a blank cell (Black cell A-1).

<Blank cell A-2>

A blank cell (Blank cell A-2) was prepared in the same manner as in the case of Blank cell A-1 except that the silica beads (average particle size=1.3 μm) were changed to those having an average particle size of 2.4 μm.

<Black cell B-1>

Two 1.1 mm-thick glass substrates were each coated with a ca. 70 nm-thick ITO film (0.9 cm² in planar area) as a transparent electrode.

On each of the thus-coated substrates, a 0.7 wt. %-solution of a polyimide precursor (polyamic acid) for forming a polyimide represented by a recurring unit shown below was spin-coated at 500 rpm for 5 sec (as 1st coating) and at 2000 rpm for 20 sec (as 2nd coating).

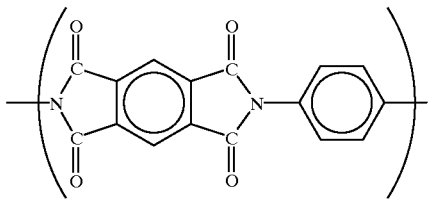

Thereafter, each of the thus-treated substrates was pre-dried at 80° C. for 5 min., followed by hot-baking at 200° C. for 1 hour to obtain a 10 nm-thick polyimide film.

Each of the thus-obtained polyimide films was subjected to rubbing treatment (as a uniaxial aligning treatment) with a nylon cloth in the same manner as in Blank cell A-1 to provide an alignment control film.

Then, similarly as n Blank cell A-1, silica beads (average particle size=1.3 μm) was dispersed on one of the substrates, followed by application of a thermosetting liquid adhesive.

The thus-obtained two substrates were applied to each other so that their rubbing axes were in parallel with each other and directed in an identical direction, followed by heating for curing the thermosetting liquid adhesive in the same manner as in Blank cell A-1 to prepare a blank cell (Black cell B-1).

<Blank cell B-2>

A blank cell (Blank cell B-2) was prepared in the same manner as in the case of Blank cell B-1 except that the silica beads (average particle size=1.3 μm) were changed to those having an average particle size of 2.4 μm.

Measurement of surface potential of polyimide alignment film

Each of the polyimide alignment control films formed on the respective substrates (for Blank cells A-1, A-2, B-1 and B-2) was subjected to measurement of surface potential by using a vibrating reed electrometer ("Model 320B", mfd. by Trek Co.) under a reduced pressure of 0.13–13.3 Pa in order to obviate adverse influences of particularly humidity etc.

As a result of the measurement, the polyimide alignment control film for Blank cells A-1 and A-2 showed a surface potential of −130 m and the polyimide alignment control film for Blank cells B-1 and B-2 showed a surface potential of −300 mV.

Then, six liquid crystal devices (Devices a1, a2, a3, b1, b2 and b3) were prepared by using the above-prepared three liquid crystals (LC-1, LC-2 and LC-3) and four blank cells (Bank cells A-1, A-2, B-2 and B-2) in the following combinations, respectively.

| Device | Liquid crystal | Blank cell |
|--------|----------------|------------|
| a1     | LC-1           | A-1        |
| a2     | LC-2           | A-2        |
| a3     | LC-3           | A-1        |
| b1     | LC-1           | B-1        |
| b2     | LC-2           | B-2        |
| b3     | LC-3           | B-1        |

Each of the liquid crystal devices was prepared by injecting the liquid crystal into the blank cell at its isotropic liquid temperature (Iso) and placed on a hot stage ("FP82", mfd. by Mettler Co.), followed by gradually cooling from Iso to SmC* via SmA while effecting temperature control with a temperature controller ("FP80HT", mfd. by Mettler Co.).

The thus-prepared six liquid crystal devices (Device a1, a2, a3, b1, b2 and b3) were evaluated in the following manners in terms of alignment state, optical response (V-T) characteristic and retardation (-voltage) characteristic.

<Alignment state>

Each of the devices was subjected to texture observation of the liquid crystal through a polarizing microscope at a prescribed temperature in SmC* (80° C. for Devices a1 and b, 50° C. for Devices a2 and b2 and 60° C. for Devices a3 and b3).

The results are shown in Table 1.

TABLE 1

| Device | Texture (alignment state)* |
|---|---|
| a1 | α state |
| a2 | α state |
| a3 | β state |
| b1 | β state |
| b2 | β state |
| b3 | β state |

* α state: uniform homogeneous alignment state providing an optical axis (of liquid crystal) substantially coinciding with the rubbing direction.
β state: bistable two states co-present in mixture with a symmetrical center line coinciding with the rubbing direction.

<Optical response (V-T) characteristic>

Each of the devices was subjected to measurement of electrooptical response by using a polarizing microscope equipped with a photomultiplier while applying a triangular waveform voltage (0 to ±5 volts, 0.1 Hz), whereby a change in transmittance (T) with an applied voltage (V) was observed under cross-nicol condition.

In this instance, the device was disposed between a pair of cross-nicol polarizers so that one of polarizing axes coincided with the rubbing axis to provide the darkest state under no voltage application.

The measurement temperatures were 80° C. for Devices a1 and b1, 50° C. for Devices a2 and b2 and 60° C. for Devices a3 and b3.

Figure 4:
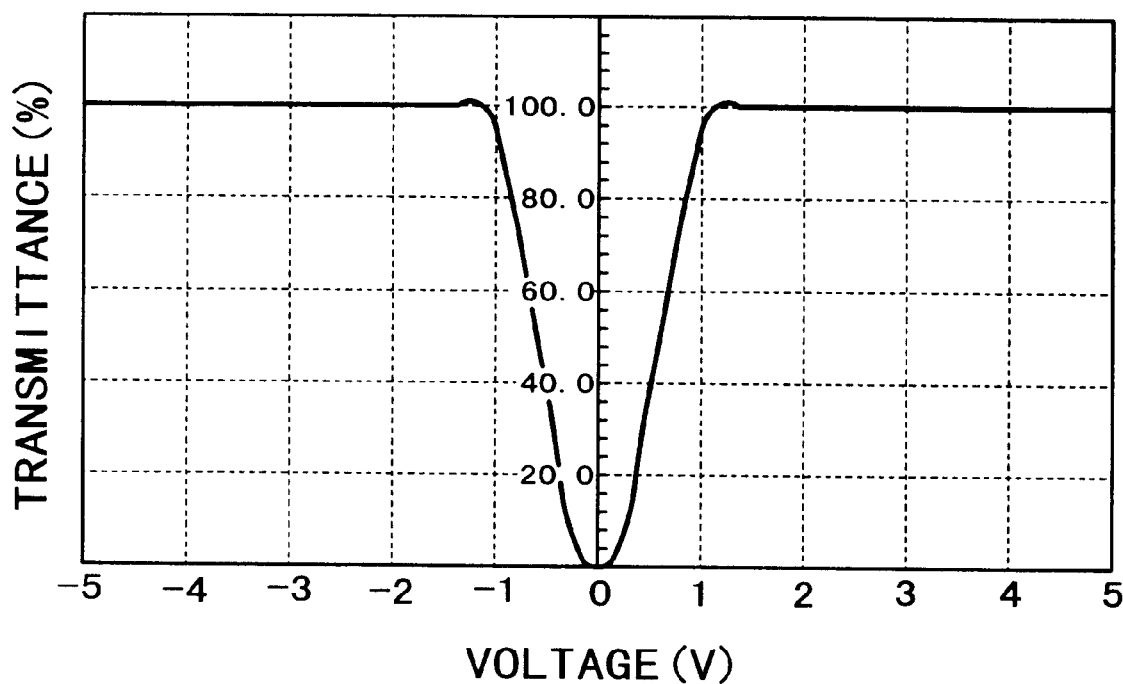
FIGS. 4, 5, 10 and 11 are respectively a graph showing an electrooptical (voltage-transmittance (V-T)) characteristic of the liquid crystal device (Device a1 in Example 1 for FIG. 4, Device a2 in Example 1 for FIG. 5, Device c1 in Example 2 for FIG. 10, Device c2 in Example 2 for FIG. 11) of the present invention.
Figure 5:
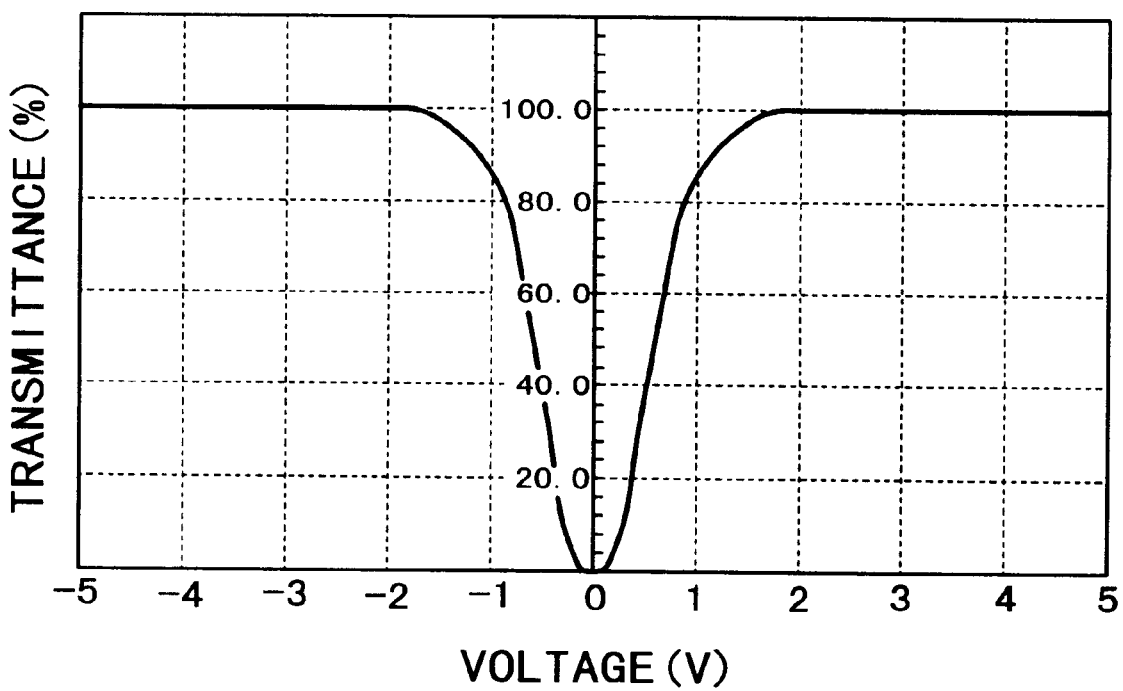

As a result, Device a1 exhibited a V-T characteristic shown in FIG. 4 and Device a2 exhibited a V-T characteristic shown in FIG. 5.

As apparent from FIGS. 4 and 5, Devices a1 and a2 showed a V-shaped V-T characteristic such that the resultant transmittance T) continuously changed depending on magnitude and polarity of the applied voltage (V).

This may be attributable to a combination of a strong interaction of liquid crystal molecules with the polyimide alignment control film having a hexamethylene chain as its partial structure used in Device a1 (using Blank cell A-1) and Device a2 (using Blank cell A-2) and a strong intermolecular interaction between molecular layers of the liquid crystals LC-1 and LC-2 injected into Blank cells A-1 and A-2, respectively.

On the other hand, other Devices a3, b1, b2 and b3 exhibited a bistable switching characteristic with a threshold value as in an ordinary ferroelectric liquid crystal device.

<Retardation (-voltage) characteristic>

Devices a1 and a2 showing the V-shaped V-T characteristics (FIGS. 4 and 5) were respectively subjected to measurement of retardation of the liquid crystal layer by using a Berek compensator while gradually increasing a voltage (electric field) applied to the liquid crystal layer from zero volt (no electric field) to a saturation voltage providing a maximum (saturation) transmittance (100%).

Figure 6:
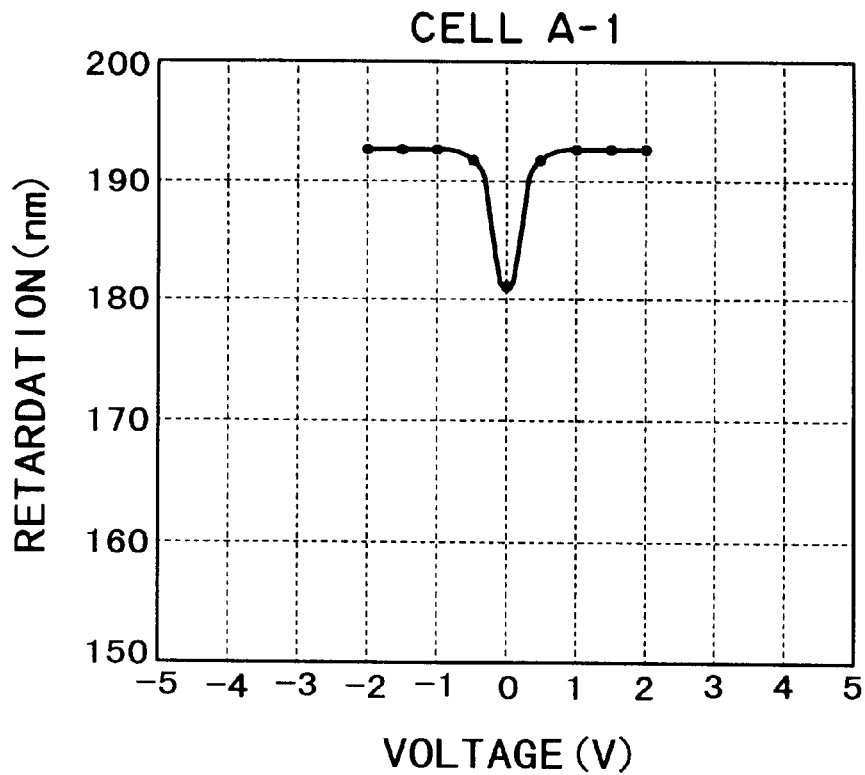
FIGS. 6 and 7 are respectively a graph showing a voltage-retardation characteristic of the liquid crystal device (Device a1 in Example 1 for FIG. 6, Device a2 in Example 1 for FIG. 7) of the present invention.
Figure 7:
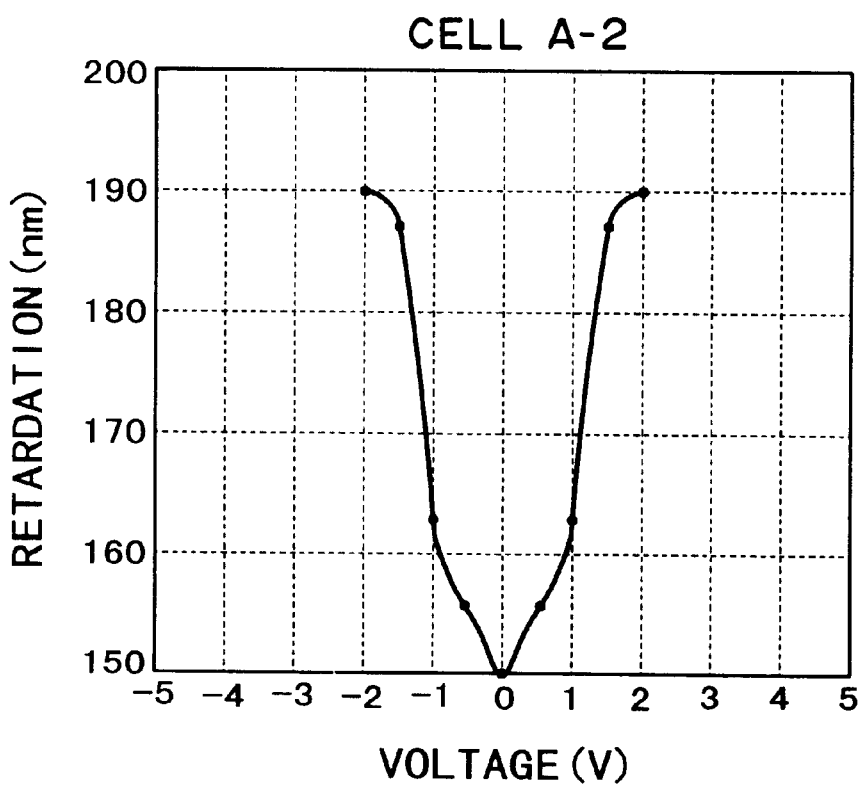

The results are shown in FIG. 6 for Device a1 and FIG. 7 for Device a2.

As apparent from FIGS. 6 and 7, in either case, the retardation showed a minimum under no electric field (zero volt) and monotonously increased with the electric field strength (magnitude of the applied voltage) to provide a maximum in such a state that the transmittance was saturated.

Figure 8A:
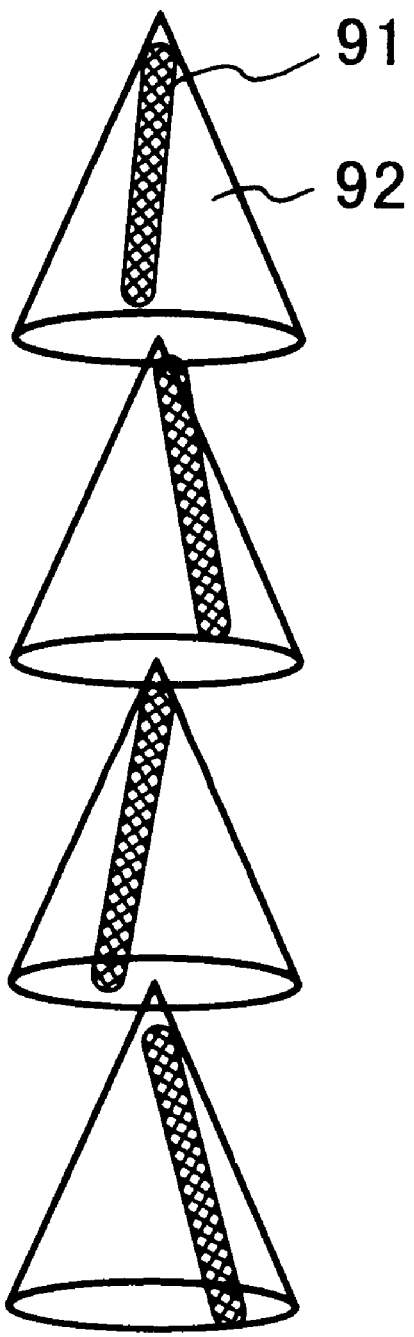
FIGS. 8A and 8B are respectively a schematic view showing an example of a molecular alignment state of liquid crystal molecules in the liquid crystal device of the present invention under no electric field application and FIG. 9 is a schematic view showing an example of a molecular alignment state of liquid crystal molecules in the liquid crystal device under application of electric field.
Figure 8B:
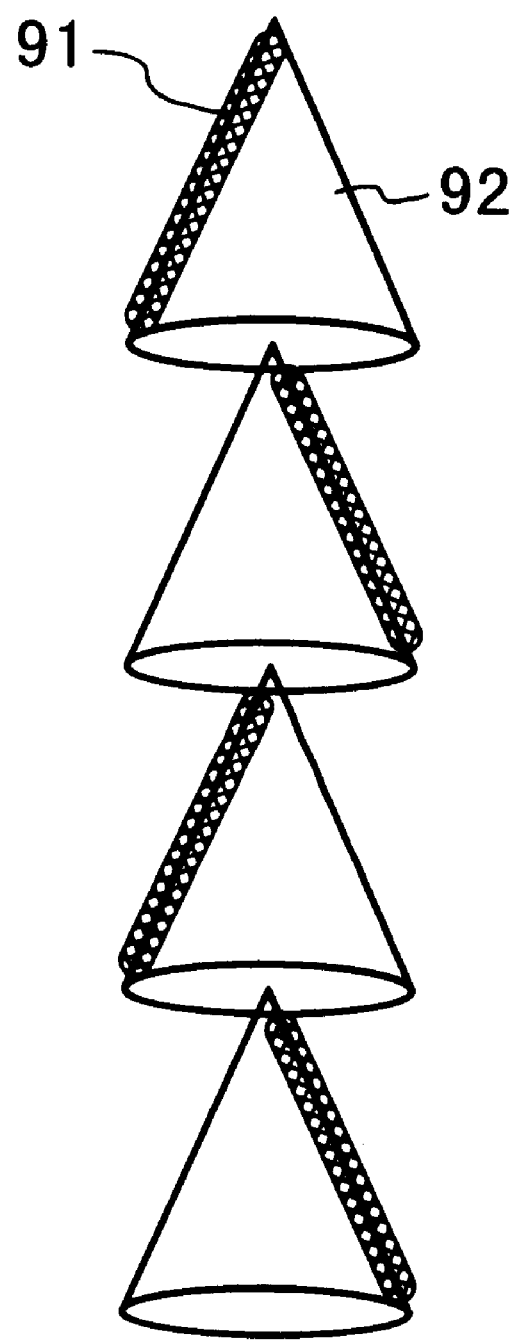

According to the above results, under no electric field, the liquid crystal molecules are assumed to be tilted, respectively, from at least the average rubbing axis with various angles, e.g., as shown in FIGS. 8A and 8B.

Referring to FIGS. 8A and 8B, liquid crystal molecules (molecular axes) 91 (of the chiral smectic liquid crystal) are tilted from an average uniaxial aligning treatment axis (average rubbing axis or a bisector of an apex angle of a virtual cone 92), respectively, and located in at least two positions forming various (at least two) angles with the average uniaxial aligning treatment axis on a virtual cone 92 defining a liquid crystal molecule position. Specifically, FIG. 8A shows four liquid crystal molecular axes (molecules) 91 of the chiral smectic liquid crystal located in different positions between two extreme molecular axes (on the virtual cone 92) established under application of an electric field. FIG. 8B shows four liquid crystal molecular axes 91 located in either one of the two extreme molecular axes.

Based on these molecular axis distributions, e.g., as shown in FIGS. 8A and 8B, the resultant retardation under no electric field is considered to provide a minimum. The minimum retardation state is also a minimum transmittance state, so that under no electric field, the liquid crystal molecules 91 are considered to be placed in an alignment state such that an average molecular axis of the liquid crystal molecules 91 substantially coincides with the average uniaxial aligning treatment axis and/or a bisector of a maximum angle formed between the two extreme molecular axes (established under electric field application).

Figure 9:
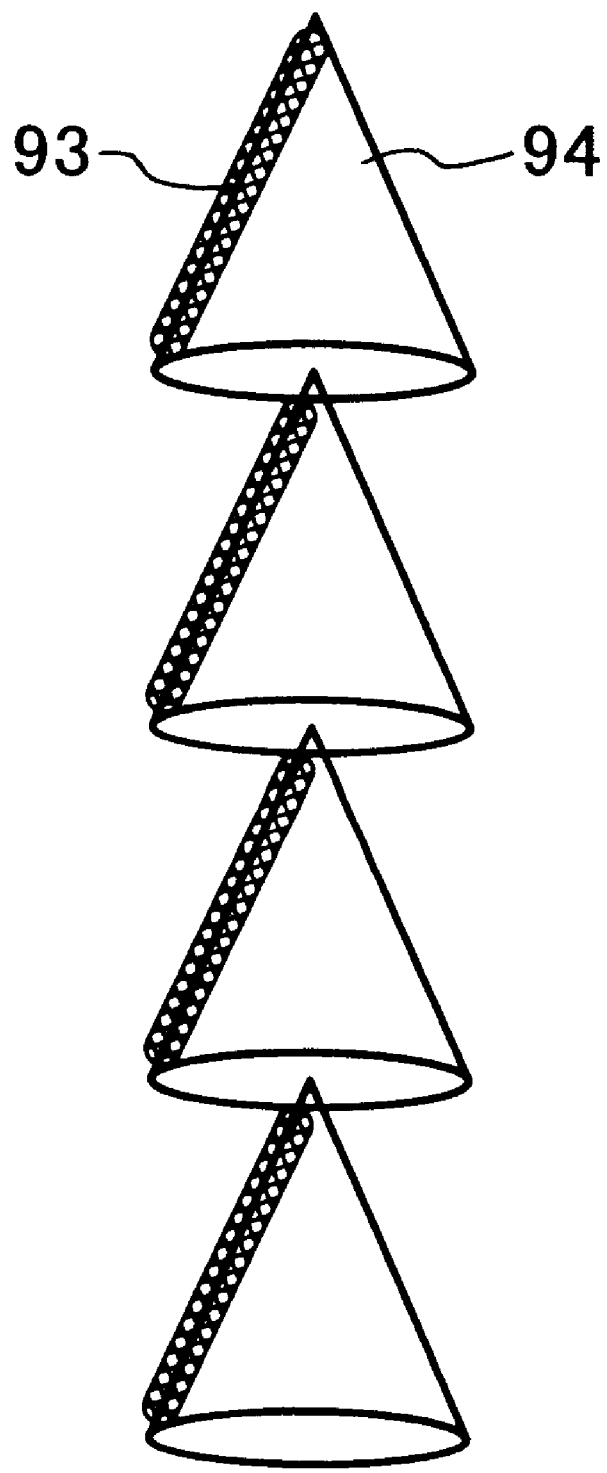

On the other hand, under application of an electric field, as shown in FIG. 9, liquid crystal molecules 93 are tilted from those under no electric field application, respectively, and finally settled in one of the two extreme molecular axes when supplied with at least a saturation voltage. Specifically, depending on strength (magnitude) and polarity of the applied electric field, the liquid crystal molecules 93 continuously change their (average) effective tilt angle and are uniformly aligned or oriented at a prescribed position to provide a larger retardation, thus finally providing a maximum retardation when the resultant transmittance is saturated (i.e., a maximum transmittance (100%)).

EXAMPLE 2

In this example, the chiral smectic liquid crystal LC-2 used in Example 1 and a chiral smectic liquid crystal LC-4 shown below were used.

<LC-4>

$$C_8H_{17}O-\text{[pyrimidine]}-\text{[phenyl]}-OCH_2\overset{*}{C}H(F)-CH_2OCH_2CF_2OCF_2CF_2OC_4F_9$$

Phase transition temperature (° C.)

$$Cry \xrightarrow{48} SmC^* \xrightarrow{102} SmA \xrightarrow{118} Iso$$

Spontaneous polarization (62° C.): 147 nC/cm$^2$
Tilt angle (62° C.): 35 degrees Two test cells (shearing-alignment cells) were prepared and evaluated in the same manner as in Example 1 except that the liquid crystals LC-2 and LC-4 were used and the evaluation temperatures were set to 50° C. for the test cell using the liquid crystal LC-2 and 80° C. and 60° C. for the test cell using the liquid crystal LC-4.

As a result, both of the liquid crystals LC-2 and LC-4 were found to provide an alignment state wherein optically stable two states (bistable states) were co-present in mixture as observed in an ordinary ferroelectric liquid crystal device. Similarly, an optical response to a voltage applied to each of the liquid crystals was also based on ferroelectricity as observed in the ordinary (ferroelectric) liquid crystal device.

(Preparation of liquid crystal device)

Two blank cells C and D were prepared in the following manner.

<Black cell C>

Two 1.1 mm-thick glass substrates were each coated with a ca. 70 nm-thick ITO film (0.9 cm² in planar area) as a transparent electrode.

On each of the thus-coated substrates, a 1.85 wt. %-solution of a polyimide precursor (polyamic acid) for forming a polyimide represented by a recurring unit shown below was spin-coated at 500 rpm for 5 sec (as 1st coating) and at 1500 rpm for 30 sec (as 2nd coating).

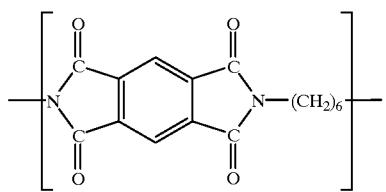

Thereafter, each of the thus-treated substrates was pre-dried at 80° C. for 5 min., followed by hot-baking at 200° C. for 1 hour to obtain a 30 nm-thick polyimide film.

Each of the thus-obtained polyimide films was subjected to rubbing treatment (as a uniaxial aligning treatment) in the same manner as in Example 1.

Then, on one of the substrates, a 0.01 wt. %-dispersion of silica beads (average particle size=2.4 μm) in IPA was spin-coated at 1500 rpm for 10 sec at a dispersion density of ca. 100 (particles)/mm², followed by application of a thermosetting liquid adhesive through a printing process.

The thus-obtained two substrates were applied to each other so that their rubbing axes were in parallel with each other and directed in an identical direction, followed by heating for curing the thermosetting liquid adhesive in an oven at 150° C. for 90 min. to prepare a blank cell (Black cell C).

<Black cell D>

Two 1.1 mm-thick glass substrates were each coated with a ca. 70 nm-thick ITO film (0.9 cm² in planar area) as a transparent electrode.

On each of the thus-coated substrates, a 0.7 wt. %-solution of a polyimide precursor (polyamic acid) for forming a polyimide represented by a recurring unit shown below was spin-coated at 500 rpm for 5 sec (as 1st coating) and at 2000 rpm for 20 sec (as 2nd coating).

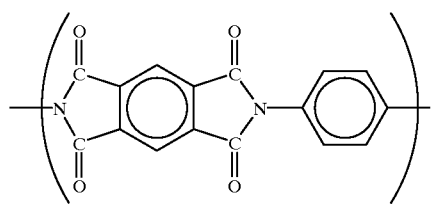

Thereafter, each of the thus-treated substrates was pre-dried at 80° C. for 5 min., followed by hot-baking at 200° C. for 1 hour to obtain a 10 nm-thick polyimide film.

Each of the thus-obtained polyimide films was subjected to rubbing treatment (as a uniaxial aligning treatment) with a nylon cloth in the same manner as in Blank cell A-1 to provide an alignment control film.

Then, similarly as in Blank cell C, silica beads (average particle size=2.4 μm) was dispersed on one of the substrates, followed by application of a thermosetting liquid adhesive.

The thus-obtained two substrates were applied to each other so that their rubbing axes were in parallel with each other and directed in an identical direction, followed by heating for curing the thermosetting liquid adhesive in the same manner as in Blank cell C to prepare a blank cell (Black cell D).

Then, four liquid crystal devices (Devices c1, c2, d1 and d2) were prepared by using the above-prepared two liquid crystals (LC-2 and LC-4) and two blank cells (Bank cells C and D) in the following combinations, respectively, otherwise similarly as in Example 1.

| Device | Liquid crystal | Blank cell |
|--------|----------------|------------|
| c1 | LC-2 | C |
| c2 | LC-4 | C |
| d1 | LC-2 | D |
| d2 | LC-4 | D |

The thus-prepared four liquid crystal devices (Device c1, c2, d1 and d2) were evaluated in the same manner as in Example 1 in terms of alignment state, optical response (V-T) characteristic and retardation (-voltage) characteristic.

<Alignment state>

Each of the devices was subjected to texture observation of the liquid crystal through a polarizing microscope at 50° C. in SmC*.

The results are shown in Table 2.

TABLE 2

| Device | Texture (alignment state)* |
|--------|----------------------------|
| c1 | α state |
| c2 | α state |
| d1 | β state |
| d2 | β state |

*α state: uniform homogeneous alignment state providing an optical axis (of liquid crystal) substantially coinciding with the rubbing direction.
β state: bistable two states co-present in mixture with a symmetrical center line coinciding with the rubbing direction.

<Optical response (V-T) characteristic>

Figure 10:
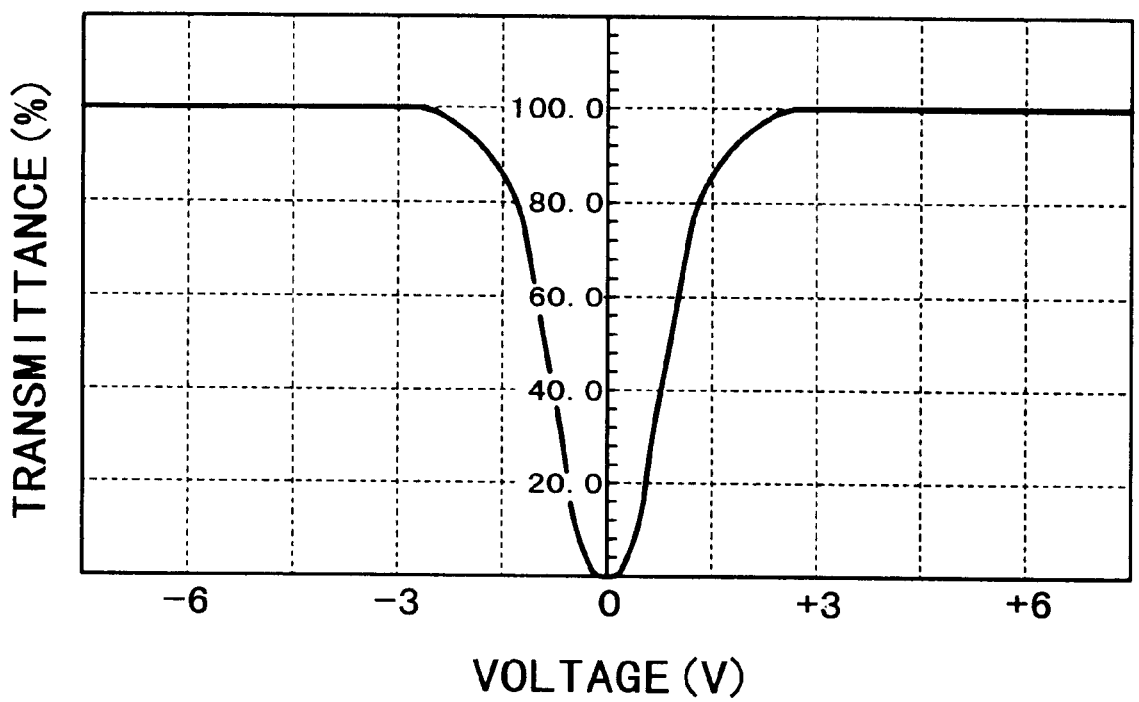
Figure 11:
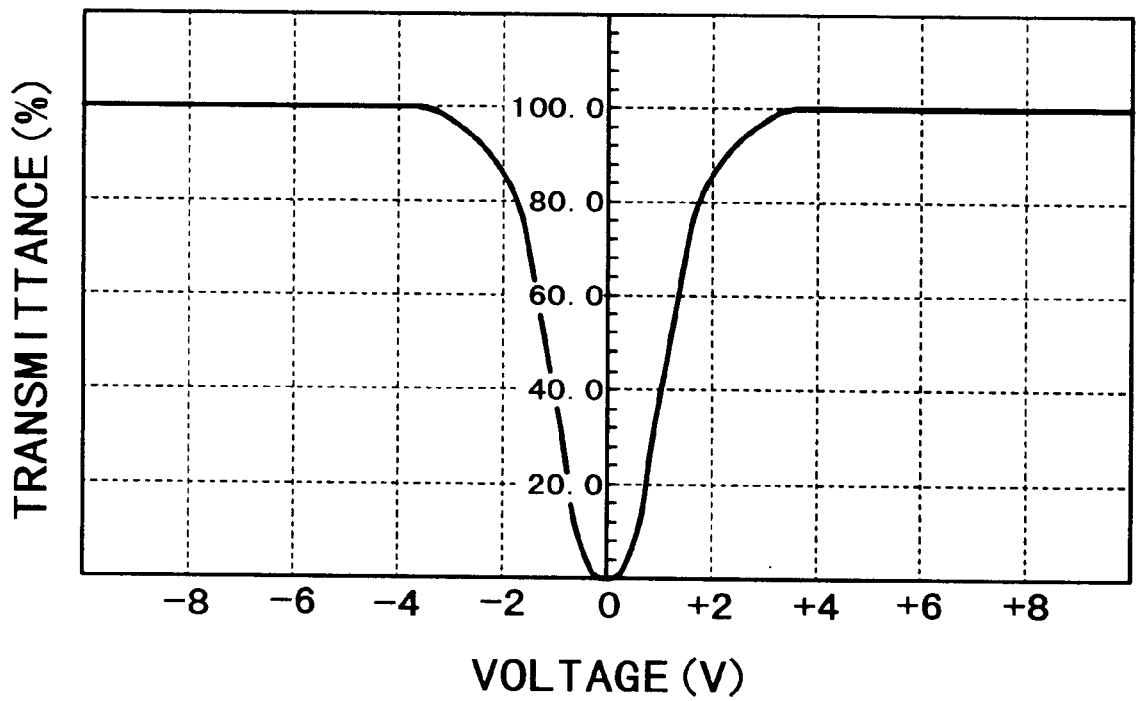

As a result of the optical response characteristic at 50° C., Device c1 exhibited a V-T characteristic shown in FIG. 10 and Device c2 exhibited a V-T characteristic shown in FIG. 11.

As apparent from FIGS. 10 and 11, Devices c1 and c2 showed a V-shaped V-T characteristic such that the resultant transmittance T) continuously changed depending on magnitude and polarity of the applied voltage (V).

This may be attributable to a combination of a strong interaction of liquid crystal molecules with the polyimide alignment control film having a hexamethylene chain as its partial structure used in Device c1 (using Blank cell C) and Device c2 (using Blank cell C) and a strong intermolecular interaction between molecular layers of the liquid crystals LC-2 and LC-4 injected into Blank cell C.

On the other hand, other Devices d1 and d2 exhibited a bistable switching characteristic with a threshold value as in an ordinary ferroelectric liquid crystal device.

EXAMPLE 3

A chiral smectic liquid crystal composition LCC-a was prepared by mixing the chiral smectic liquid crystal LC-2 (used also in Examples 1 and 2) and a chiral smectic liquid crystal LC-5 in the indicated proportions.

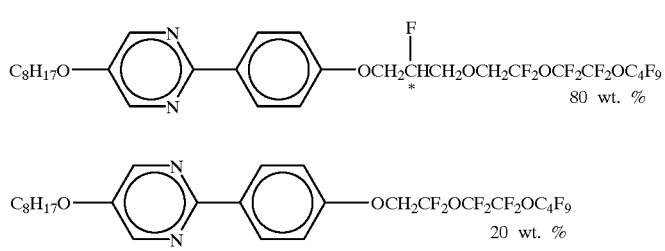

The liquid crystal composition LCC-a showed the following phase transition series and properties.

Phase transition temperature (° C.)

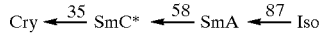

Spontaneous polarization (40° C.): 85 nC/cm$^2$

Tilt angle (40° C.): 26.5 degrees

The thus-prepared liquid crystal composition LCC-a was injected into Blank cell C and Blank cell D prepared similarly as in Example 2 to prepare two liquid crystal devices (Devices e1 and e2), respectively.

When the thus-prepared liquid crystal devices (Devices e1 and e2) were evaluated in the same manner as in Example 2 in terms of an optical response characteristic, Device e1 using Blank cell C showed a V-shaped V-T characteristic similar to that of Device c1 (prepared in Example 2) shown in FIG. 10 but Device e2 using Blank cell D showed a bistable switching characteristic with a threshold value as in an ordinary ferroelectric liquid crystal device.

EXAMPLE 4

A chiral smectic liquid crystal composition LCC-b was prepared in the same manner as in Example 3 except that the mixing ratio (LC-2/LC-5=80/20 by weight) was changed to LC-2/LC-5=50/50 by weight.

The liquid crystal composition LCC-a showed the following phase transition series and properties.

Phase transition temperature (° C.)

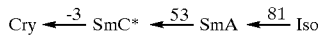

Spontaneous polarization (40° C.): 47 nC/cm$^2$

Tilt angle (40° C.): 25 degrees

The thus-prepared liquid crystal composition LCC-b and the liquid crystal composition LCC-a prepared in Example 3 were injected into Blank cell A-2 prepared similarly as in Example 1 to prepare two liquid crystal devices (Devices f1 and f2), respectively.

Further, when each of the liquid crystal compositions LCC-b and LCC-a was injected into a test cell prepared similarly as in Example 1, both of the compositions LCC-b and LCC-a showed bistability.

When the above-prepared liquid crystal devices (Devices f1 and f2) were evaluated in the same manner as in Example 1 at 40° C. in terms of an alignment state and an optical response characteristic, both of Devices f1 and f2 provided a uniform homogeneous alignment state (α state) and showed a V-shaped V-T characteristic similar to those of Device a2 (prepared in Example 1).

Further, when each of Devices f1 and f2 was supplied with an alternating rectangular wave (60 Hz, 3 volts) for 100 hours, the resultant alignment characteristic and optical response (V-T) characteristic were not substantially changed from those before the application of the alternating rectangular wave.

As described hereinabove, according to the present invention, by using the polyimide alignment control film of the formula (I) and the chiral smectic liquid crystal (composition) having a relatively small spontaneous polarization and a V-shaped V-T characteristic in combination, it becomes possible to provide a liquid crystal device (display apparatus) allowing gradational display while effectively decreasing a load exerted on the drive circuit due to the relatively small spontaneous polarization.

What is claimed is:

1. A liquid crystal device, comprising: a chiral smectic liquid crystal and a pair of substrates sandwiching the chiral smectic liquid crystal therebetween and each having thereon an electrode for applying a voltage to the liquid crystal, at least one of the substrates being provided with a uniaxial treating axis for aligning the liquid crystal, wherein at least one of the substrates is provided with an alignment control film comprising a polyimide represented by a recurring unit of the following formula (I):

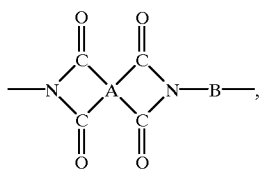

(I)

in which A represents a tetravalent group comprising an aromatic ring, an aromatic polycyclic ring, a heterocyclic ring or a condensed polycyclic ring; and B represents a divalent aliphatic group comprising an alicyclic ring or —$(Ph)_a$—$(O)_c$—$(CH_2)_x$—$(D)_e$—$(CH_2)_y$—$(O)_d$—$(Ph)_b$— where Ph represents a phenylene group; D represents —$CR_1$ ($R_2$)— in which $R_1$ and $R_2$ independently denote hydrogen or methyl group; a and b are 0 or 1 at the same time; c and d are 0 at the same time when a b=0 or are 0 or 1 at the same time when a=b=1; e is 0 or 1; and x and y are independently an integer of at least 1 but satisfy x+y+e=2–10, the liquid crystal exhibits a phase transition series including at least smectic A phase and chiral smectic phase and assumes a bistable alignment state in its chiral smectic temperature range when incorporated in a test cell including a pair of substrates each having thereon a 70 nm-thick ITO (indium-tin-oxide) film so that the liquid crystal is disposed between the ITO films to provide a cell gap of 2.4 μm and the test cell is gradually cooled from isotropic liquid to smectic A phase and subjected to a shearing treatment in a temperature range of smectic A phase, and in said chiral smectic temperature range wherein the liquid crystal assumes the bistable alignment state in the test cell, the liquid crystal disposed between the substrates at least one of which is provided with the alignment film of the polyimide has alignment characteristic and voltage-transmittance characteristic such that liquid crystal molecules, under no electric field, are aligned to provide an average molecular axis substantially coinciding with an average uniaxial aligning treatment axis and/or a bisector of a maximum angle formed between two extreme molecular axes established under application of an electric field but are respectively tilted from the average uniaxial aligning treatment axis and/or the bisector of the maximum angle to provide at least two molecular axes coinciding with the two extreme molecular axes or located therebetween and under application of an electric field, are tilted to provide an effective tilt angle and a transmittance that continuously change depending on an electric field applied thereto.

2. A device according to claim 1, wherein in the formula (I), a=b=c=d=e=0 and x+y is an integer of 2–10.

3. A device according to claim 1, wherein in the formula (I), a=b=c=d=1 and x+y+e is an integer of 2–10.

4. A device according to claim 1, wherein in the formula (I), a=b=1, c=d=e=0 and x+y is an integer of 2–10.

5. A device according to claim 1, wherein the chiral smectic liquid crystal comprises a compound having a partial structure represented by the following formula (II):

—COOC*$HX_1$—$R_1$ (II), in which $X_1$ represents —$CH_3$ or —$CF_3$ and $R_1$ represents an alkyl group having 1–20 carbon atoms optionally substituted with O or S.

6. A device according to claim 1, wherein the chiral smectic liquid crystal comprises at least a fluorine-containing compound having a fluorocarbon terminal portion, a hydrocarbon terminal portion, and a central core connecting the fluorocarbon and hydrocarbon terminal portions.

7. A device according to claim 1, wherein the chiral smectic liquid crystal comprises a compound having a central core and two terminal portions each connected with the central core, at least one of the terminal portions having a terminal group substituted by —CN, —OH, —COOH, —$CF_3$, —F, —$NH_2$ or a phenyl group which is optionally substituted with an alkyl group having 1–5 carbon atoms, an alkoxy group having 1–5 carbon atoms, halogen, —$CF_3$ or —CN.

8. A device according to claim 1, wherein the chiral smectic liquid crystal comprises a fluorine-containing chiral mesomorphic compound comprising:

a) a fluorocarbon terminal portion having at least one methylene group and optionally having at least one catenary ether oxygen, b) a chiral or achiral saturated hydrocarbon terminal portion, and c) a central core connecting the fluorocarbon and hydrocarbon terminal portions.

9. A device according to claim 1, wherein the chiral smectic liquid crystal comprises an achiral compound comprising a fluorocarbon terminal portion having at least one catenary ether oxygen and a hydrocarbon terminal portion connected by a central core with the fluorocarbon terminal portion.

10. A device according to claim 1, wherein one of the pair of substrates is provided with a plurality of active elements each connected with an associated electrode so as to allow an analog-like gradational display.

11. A device according to claim 1, wherein the polyimide alignment control film exhibits a surface potential of at most 200 mV as an absolute value.

12. A device according to claim 1, wherein the chiral smectic liquid crystal has a spontaneous polarization of at most 200 nC/cm².

13. A liquid crystal display apparatus, comprising: a liquid crystal device according to claim 1, a drive circuit for driving the liquid crystal device and a light source.

14. An apparatus according to claim 13, wherein the drive circuit comprises means for performing an active matrix drive of the liquid crystal device to effect gradational display.

* * * * *

UNITED STATES PATENT AND TRADEMARK OFFICE
CERTIFICATE OF CORRECTION

PATENT NO.  : 6,128,064
DATED       : October 3, 2000
INVENTOR(S) : Takashi Moriyama et al.

It is certified that error appears in the above-identified patent and that said Letters Patent is hereby corrected as shown below:

Column 1,
Line 55, "Similarly" should read -- Similarly, --.

Column 2,
Line 33, "continuous" should read -- continuously --.

Column 10,
Line 25, "by" should read -- be --;
Line 29, "by" should read -- be --;
Line 35, "by" should read -- be --.

Column 25,
Line 13, "Cry (Cry: crystal phase, $SmC_A^*$: chiral smectic $C_A$ phase,
$SmC^*$: chiral smectic C phase, SmA: smectic A phase,
and Iso: isotropic liquid phase)

Column 35,
Line 19, "a b=0" shoud read -- a=b=0 --.

Signed and Sealed this

Twenty-fifth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,128,064
DATED        : October 3, 2000
INVENTOR(S)  : Takashi Moriyama et al.

It is certified that error appears in the above-identified patent and that said Letters Patent is hereby corrected as shown below:

Column 1,
Line 55, "Similarly" should read -- Similarly, --.

Column 2,
Line 33, "continuous" should read -- continuously --.

Column 10,
Line 25, "by" should read -- be --;
Line 29, "by" should read -- be --;
Line 35, "by" should read -- be --.

Column 25,
Line 13, $$\text{"Cry} \xleftarrow{-11} \text{SmC}_A^* \xleftarrow{76} \text{SmC}^* \xleftarrow{84} \text{SmA} \xleftarrow{110} \text{Iso"}$$

should read $$\text{--Cry} \xleftarrow{-11} \text{SmC}_A^* \xleftarrow{76} \text{SmC}^* \xleftarrow{84} \text{SmA} \xleftarrow{110} \text{Iso--}.$$

(Cry: crystal phase, $SmC_A^*$: chiral smectic $C_A$ phase, $SmC^*$: chiral smectic C phase, SmA: smectic A phase, and Iso: isotropic liquid phase)

UNITED STATES PATENT AND TRADEMARK OFFICE
CERTIFICATE OF CORRECTION

PATENT NO. : 6,128,064
DATED : October 3, 2000
INVENTOR(S) : Takashi Moriyama et al.

It is certified that error appears in the above-identified patent and that said Letters Patent is hereby corrected as shown below:

Column 35,
Line 19, "a b=0" shoud read -- a=b=0 --.

This certificate supercedes the Certificate of Correction issued on December 25, 2001.

Signed and Sealed this

Twenty-ninth Day of January, 2002

*Attest:*

*Attesting Officer*

JAMES E. ROGAN
*Director of the United States Patent and Trademark Office*